(12) United States Patent
Aragon et al.

(10) Patent No.: US 12,036,979 B2
(45) Date of Patent: Jul. 16, 2024

(54) DYNAMIC DISTANCE ESTIMATION OUTPUT GENERATION BASED ON MONOCULAR VIDEO

(71) Applicants:Allstate Insurance Company, Northbrook, IL (US); The Board of Trustees of The Leland Stanford Junior University, Stanford, CA (US)

(72) Inventors: Juan Carlos Aragon, Redwood City, CA (US); Derek Phillips, Stanford, CA (US); Regina Madigan, Mountain View, CA (US); Sunil Chintakindi, Menlo Park, IL (US); Mykel Kochenderfer, Stanford, CA (US)

(73) Assignees: ALLSTATE INSURANCE COMPANY, Northbrook, IL (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 17/752,483

(22) Filed: May 24, 2022

(65) Prior Publication Data

US 2023/0174056 A1 Jun. 8, 2023

Related U.S. Application Data

(63) Continuation of application No. 16/774,647, filed on Jan. 28, 2020, now Pat. No. 11,338,807.
(Continued)

(51) Int. Cl.
*B60W 30/09* (2012.01)
*B60W 30/18* (2012.01)
(Continued)

(52) U.S. Cl.
CPC ............ *B60W 30/09* (2013.01); *B60W 30/18* (2013.01); *G05B 13/027* (2013.01);
(Continued)

(58) Field of Classification Search
CPC .. B60W 30/18; B60W 2420/42; B60W 50/14; B60R 1/00; B60R 2300/10;
(Continued)

(56) References Cited

U.S. PATENT DOCUMENTS

2016/0180531 A1    6/2016   Lessmann et al.
2019/0103023 A1    4/2019   McNew et al.
(Continued)

FOREIGN PATENT DOCUMENTS

CN        108596058 A    9/2018
FR        3027432 A1    4/2016
(Continued)

OTHER PUBLICATIONS

Scheidegger et al.; Mono-Camera 3D Multi-Object Tracking Using Deep Learning Detections and PMBM Filtering; 2018 IEEE Intelligent Vehicles Symposium (IV) Changshu, Suzhou, China, Jun. 26-30, 2018; pp. 433-440 (Year: 2018).*
(Continued)

*Primary Examiner* — Michael J Zanelli
(74) *Attorney, Agent, or Firm* — Polsinelli PC

(57) ABSTRACT

Aspects of the disclosure relate to a dynamic distance estimation output platform that utilizes improved computer vision and perspective transformation techniques to determine vehicle proximities from video footage. A computing platform may receive, from a visible light camera located in a first vehicle, a video output showing a second vehicle that is in front of the first vehicle. The computing platform may determine a longitudinal distance between the first vehicle and the second vehicle by determining an orthogonal dis-
(Continued)

tance between a center-of-projection corresponding to the visible light camera, and an intersection of a backside plane of the second vehicle and ground below the second vehicle. The computing platform may send, to an autonomous vehicle control system, a distance estimation output corresponding to the longitudinal distance, which may cause the autonomous vehicle control system to perform vehicle control actions.

19 Claims, 22 Drawing Sheets

Related U.S. Application Data

(60) Provisional application No. 62/798,576, filed on Jan. 30, 2019.

(51) Int. Cl.
```
G05B 13/02      (2006.01)
G05D 1/00       (2024.01)
G06V 10/44      (2022.01)
G06V 10/82      (2022.01)
G06V 20/20      (2022.01)
G06V 20/58      (2022.01)
```
(52) U.S. Cl.
CPC ......... *G05D 1/0088* (2013.01); *G05D 1/0221* (2013.01); *G06V 10/446* (2022.01); *G06V 10/454* (2022.01); *G06V 10/82* (2022.01); *G06V 20/20* (2022.01); *G06V 20/58* (2022.01); *B60R 2300/10* (2013.01); *B60R 2300/20* (2013.01); *B60R 2300/80* (2013.01); *B60W 2420/403* (2013.01); *B60W 2520/10* (2013.01); *B60W 2554/20* (2020.02); *B60W 2554/4041* (2020.02); *G06V 2201/08* (2022.01)

(58) Field of Classification Search
CPC .... G05D 1/0088; G05D 1/0221; G06V 10/22; G06V 20/58
See application file for complete search history.

(56) References Cited

U.S. PATENT DOCUMENTS

| | | |
|---|---|---|
| 2019/0317519 A1 | 10/2019 | Chen |
| 2020/0090366 A1 | 3/2020 | Korjus et al. |
| 2021/0042955 A1 | 2/2021 | Lee et al. |

FOREIGN PATENT DOCUMENTS

| | | |
|---|---|---|
| WO | WO-2018132607 A2 | 7/2018 |
| WO | WO-2018151754 A1 | 8/2018 |

OTHER PUBLICATIONS

Christiansen et al.; Monocular Vehicle Distance Sensor Using HOG and Kalman Tracking; 2017 51st Asilomar Conf. on Signals, Systems, and Computers; Pacific Grove, CA; 2017; pp. 178-182 (Year: 2017).*
Alvarez S., et al., "Camera Auto-Calibration Using Zooming and Zebra-Crossing for Traffic Monitoring Applications," Computer Engineering Department, Polytechnic School, University of Alcala, Madrid, Spain, Retrieved from URL: http://www.robesafe.com/personal/sergio.alvarez/Sitio_web/Publications_files/itsc2013.pdf on Feb. 5, 2020, 6 pages.
Alvarez S., et al., "Monocular Target Detection on Transport Infrastructures with Dynamic and Variable Environments," Computer Engineering Department, University of Alcala, Madrid, Spain, 15th International IEEE Conference on Intelligent Transportation Systems, Anchorage, Alaska, Sep. 16-19, 2012, pp. 61-66.
Alvarez S., et al., "Monocular Vision-Based Target Detection on Dynamic Transport Infrastructures," Department of Automation, University of Alcala, Alcala de Henares, Madrid, Spain, EUROCAST 2011, Part I, LNCS 6927, 2012, pp. 576-583.
Arnaldo G., "Vehicle Detection and Tracking using Computer Vision," Chat Bots Life, Retrieved from URL: https://chatbotslife.com/vehicle-detection-and-tracking-using-computer-vision-baea4df65906 on Mar. 7, 2017, pp. 1-12.
"Estimating Distance to Objects in the Scene Using Detection Information," GitHub, Retrieved from URL: https://github.com/harshilpatel312/KITTI-distance-estimation on Feb. 5, 2020, pp. 1-6.
He K., et al., "Mask R-CNN," Facebook AI Research (FAIR), Jan. 24, 2018, Retrieved from URL: https://arxiv.org/abs/1703.06870, pp. 1-12.
Huang L., et al., "Robust Inter-Vehicle Distance Estimation Method Based on Monocular Vision," IEEE, vol. 7, Apr. 1, 2019, Retrieved from URL: https://eeexplore.ieee.org/document/8678911 on Jan. 27, 2020, 1 page.
International Preliminary Report on Patentability for International Application No. PCT/US2020/015688, mailed Aug. 12, 2021, 7 Pages.
International Search Report and Written Opinion for International Application No. PCT/US2020/015688, mailed May 29, 2020, 10 Pages.
Kazakov I., "Vehicle Detection and Tracking," Towards Data Science, May 14, 2017, Retrieved from URL: https://towardsdatascience.com/vehicle-detection-and-tracking-44b851d70508 on Jan. 27, 2020, pp. 1-9.
Lin T-Y., et al., "Microsoft COCO: Common Objects in Context," Feb. 21, 2015, Retrieved from URL: https://arxiv.org/abs/1405.0312, pp. 1-15.
Majek K., "Mask RCNN—COCO—Instance Segmentation," YouTube, Retrieved from URL: https://www.youtube.com/watch?v=OOT3UIXZztE&list=TLPQMDMwMjlwMjBFdD5cxhUVDw&index=2 on Nov. 6, 2017, pp. 1-2.
Majek K., "Yolo Coco Object Detection #1," YouTube, Retrieved from URL: https://www.youtube.com/watch?=yQwfDxBMtXg&list=TLPQMDMwMjlwMjBFdD5cxhUVDw&inde=1 on May 23, 2017, pp. 1-3.
Michels J., et al., "High Speed Obstacle Avoidance using Monocular Vision and Reinforcement Learning," Computer Science Department, Stanford University, Stanford, CA 94305 USA, 2005, pp. 1-8.
Nieto M., "Real-Time Vehicle Detection and Lane Detection for ADAS," Marcos Nieto Blog, Jul. 27, 2016, Retrieved from URL: https://marcosnietoblog.wordpress.com/2016/07/27/real-time-vehicle-detection-and-lane-detection-for-adas/, pp. 1-6.
"Real-time Vehicle Distance Measurement Using Single Camera," YouTube, HumanLAB, Sep. 17, 2017, Retrieved from URL: https://www.youtube.com/watch?v=IJ50RMUTvWA, pp. 1-2.
Redmon J., et al., "YOLO9000: Better, Faster, Stronger," University of Washington, Allen Institute for AI, Dec. 25, 2016, Retrieved from URL: https://ariixiv.org/abs/1612.08242, pp. 1-9.
Yang Z., et al., "Safety Distance Identification for Crane Drivers Based on Mask R-CNN," MDPI, Basel, Switzerland Sensors 2019, vol. 19 (2789), Jun. 21, 2019, DOI: 10.3390/s19122789, Retrieved from URL: www.mdpi.com/journal/sensors, pp. 1-13.

\* cited by examiner

1805

Display Interface

You are too close to the vehicle ahead – Brake to Slow Down!

Distance to Vehicle:     5 feet

Display Interface

Your driving skills over the past month have been excellent. This will be reflected in a 5% reduction in your insurance rate for the following month. Great job!

FIG. 19

DYNAMIC DISTANCE ESTIMATION OUTPUT GENERATION BASED ON MONOCULAR VIDEO

CROSS-REFERENCE TO RELATED APPLICATIONS

This application is a continuation of and claims the benefit of and priority to U.S. patent application Ser. No. 16/774,647, filed Jan. 28, 2020, and entitled "Dynamic Distance Estimation Output Generation Based on Monocular Video,", which claims the benefit of and priority to U.S. Provisional Patent Application Ser. No. 62/798,576, filed Jan. 30, 2019, and entitled "Dynamic Distance Estimation Output Generation Based on Monocular Video." Each of these applications is incorporated by reference in its entirety herein.

BACKGROUND

Aspects of the disclosure relate to enhanced processing systems for providing dynamic distance estimation outputs using improved computer vision methods and perspective transformation techniques. In particular, one or more aspects of the disclosure relate to a dynamic distance estimation output platform that utilizes video footage to compute vehicle proximities.

Many organizations and individuals rely on proximity of a first vehicle to a second vehicle in autonomous vehicle control. In many instances, however, such proximity is determined using light detection and ranging (LIDAR) equipment, which may be very expensive to obtain and install. This presents limitations to those unable to afford such equipment. There remains an ever-present need to develop a more cost-effective way to determine vehicle proximities.

SUMMARY

Aspects of the disclosure provide effective, efficient, scalable, and convenient technical solutions that address and overcome the technical problems associated with determining vehicle proximities using footage from visible light cameras by implementing advanced computer vision and perspective transformation techniques. In accordance with one or more arrangements discussed herein, a computing platform having at least one processor, a communication interface, and memory may receive, from a visible light camera located in a first vehicle, a video output containing video footage of a second vehicle (that may be in front of the first vehicle). The computing platform may use one or more deep learning algorithms to determine a longitudinal distance between the first vehicle and the second vehicle by determining an orthogonal distance between a center-of-projection corresponding to the visible light camera and an intersection of a backside plane of the second vehicle and ground below the second vehicle. In these instances, in using the one or more deep learning algorithms, the computing platform may determine a bounding box that covers visible dimensions of the second vehicle, and the bounding box may be used to determine the longitudinal distance between the first vehicle and the second vehicle. The computing device may send, to one or more of a vehicle control system or a mobile device, a distance estimation output corresponding to the longitudinal distance, which may cause the vehicle control system to perform one or more vehicle control actions and/or the mobile device to cause display of a graphical user interface based on the distance estimation output.

In some embodiments, the vehicle control system may be an autonomous vehicle control system. In some embodiments, the computing platform may determine the longitudinal distance between the first vehicle and the second vehicle by computing $$\frac{FH}{d},$$

where F is a focal length of the visible light camera measured in pixels, H is a height of the visible light camera, and d is a pixel distance between a vanishing point of an image frame and a bottom of the bounding box.

In some embodiments, the image frame may be a frame of the visible light camera and the vanishing point may be a point where lines, parallel when viewed in reality, are no longer parallel in the image frame due to perspective transformations. In these embodiments, the one or more vehicle control actions may be one or more of causing the first vehicle to maneuver or cause display of a user interface indicating the distance estimation output. In some embodiments, the computing platform may generate a conversion function that maps a two dimensional perceived width, on an image frame of the video footage of the second vehicle, to the longitudinal distance between the first vehicle and the second vehicle. The computing platform may perform the conversion function to determine the longitudinal distance between the first vehicle and the second vehicle.

In some embodiments, the computing platform may determine first longitudinal distances to one or more static objects in a first frame of the video footage. The computing platform may determine second longitudinal distances to the one or more static objects in a second frame of the video footage. The computing platform may determine an absolute speed of the first vehicle by dividing a difference between the first longitudinal distances and the second longitudinal distances by an amount of time between the first frame and the second frame.

In some embodiments, the computing platform may identify, using one or more of: a trained neural network or a brightness transition detection method, contact points for posterior wheels in the first vehicle.

In accordance with one or more additional arrangements discussed herein, a computing platform having at least one processor, a communication interface, and memory may receive, from a visible light camera located in a first vehicle, a video output containing video footage of a second vehicle, wherein the second vehicle is in front of the first vehicle. The computing platform may determine that the second vehicle is off center from the first vehicle. After determining that the second vehicle is off center from the first vehicle, the computing platform may determine a lateral distance between (1) a line that is orthogonal to an image plane of the visible light camera and that starts at a projection over a ground plane of a center of projection of the visible light camera, and (2) a middle of a backside of the second vehicle. The computing platform may send, to an autonomous vehicle control system, a distance estimation output corresponding to the lateral distance, which may cause the autonomous vehicle control system to perform one or more vehicle control actions.

In some embodiments, the computing platform may determine a bounding box that covers visible dimensions of the second vehicle, and the computing platform may determine that the second vehicle is off center from the first vehicle based on the bounding box. In some embodiments, the computing platform may determine a longitudinal distance between the first vehicle and the second vehicle, and the distance estimation output may include an indication of the longitudinal distance in addition to the lateral distance.

In some embodiments, the longitudinal distance may be determined prior to the lateral distance, and may be used to calculate the lateral distance. In some embodiments, the computing platform may determine a distance ($d_1$), within the image plane of the visible light camera, representative of a distance between a bottom left corner of the bounding box and an intersection between a vector representing the longitudinal distance and a plane of the bounding box.

In some embodiments, the computing platform may determine the lateral distance by calculating $$\frac{d_1 D_{lon}}{F} - \frac{W}{2},$$

where $D_{lon}$ is the longitudinal distance, F is a focal length of the visible light camera measured in pixels, and W is a width of the second vehicle. In these embodiments, the width of the second vehicle may be determined based on information from a vehicle attribute database.

In some embodiments, the computing platform may verify the longitudinal distance by re-calculating the longitudinal distance using a different method of calculation than was initially used to calculate the longitudinal distance. In these embodiments, the computing platform may calculate a two dimensional width (w) of the second vehicle by calculating $$\frac{FW}{D_{lon}},$$

wherein $D_{lon}$ is the longitudinal distance, F is a focal length of the visible light camera measured in pixels, and W is a width of the second vehicle. In some embodiments, the computing platform may re-calculate the longitudinal distance by calculating $$\frac{FW}{w}.$$

In accordance with one or more additional arrangements discussed herein, a computing platform having at least one processor, a communication interface, and memory may receive, from a visible light camera located in a first vehicle, a video output containing video footage of one or more additional vehicles. The computing platform may determine a first longitudinal distance and a first lateral distance with respect to each of the one or more additional vehicles at a first frame of the video footage, resulting in first distances. The computing platform may determine a second longitudinal distance and a second lateral distance with respect to each of the one or more additional vehicles at a second frame of the video footage, resulting in second distances. For each of the one or more additional vehicles, the computing platform may determine a relative speed by (1) determining a difference between the first distances and the second distances, and (2) dividing the difference by an amount of time between the first frame and the second frame. For each of the one or more additional vehicles, the computing platform may determine a relative acceleration by dividing the relative speed by the amount of time between the first frame and the second frame. For each of the one or more additional vehicles, the computing platform may determine an absolute speed by adding a speed of the first vehicle to the respective vehicle's relative speed.

In some embodiments, the computing platform may determine an absolute acceleration for the first vehicle by: (1) determining a difference between a first absolute speed of the first vehicle at the first frame and a second absolute speed of the first vehicle at the second frame, (2) dividing the difference between the first absolute speed of the first vehicle at the first frame and the second absolute speed of the first vehicle at the second frame, and (3) determining, for each of the one or more additional vehicles, an absolute acceleration by adding the absolute acceleration of the first vehicle to each of the one or more additional vehicle's respective relative accelerations.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 18 and 19 depict a graphical user interfaces for a dynamic distance estimation output platform that utilizes improved computer vision and perspective transformation techniques in accordance with one or more example arrangements discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following disclosure provides a method to estimate, in real time, the distance between a vehicle and any other vehicle in front of it through computer vision and perspective transformation techniques. For this purpose, the vehicle may be equipped with a visible light camera mounted on the dashboard. The distances to vehicles in front may be computed as longitudinal and lateral. Arrangements described herein also provide an alternate method to compute longitudinal distances to vehicles in front based on the perceived width of the vehicle. The alternate method may be used to augment or to validate the first method.

In the autonomous driving industry, distances to other vehicles may be generally obtained through LIDAR (which may be an expensive piece of equipment). Arrangements described herein include aspects that include a visible light camera that provides the benefit of simplicity and low cost deployment since LIDAR equipment could potentially cost several thousand dollars (forty thousand dollars in some cases). In contrast, a useful visible light camera may cost under a hundred dollars. This may reduce deployment costs and allow massive deployment of a computer vision infrastructure based on the arrangements described herein.

Distance estimation may be important to any type of application or model that uses a description of the driving scene around a vehicle. These descriptions may be based on the locations of the vehicles in the scene, the relative and absolute speeds of such vehicles, and/or their accelerations. An example of such application is a model that estimates the level of risk for a particular driver on a driving scene. Similarly, driving behavior models also may be based on vehicle positions at every point in time so as to estimate speeds and accelerations.

Figure 1A:
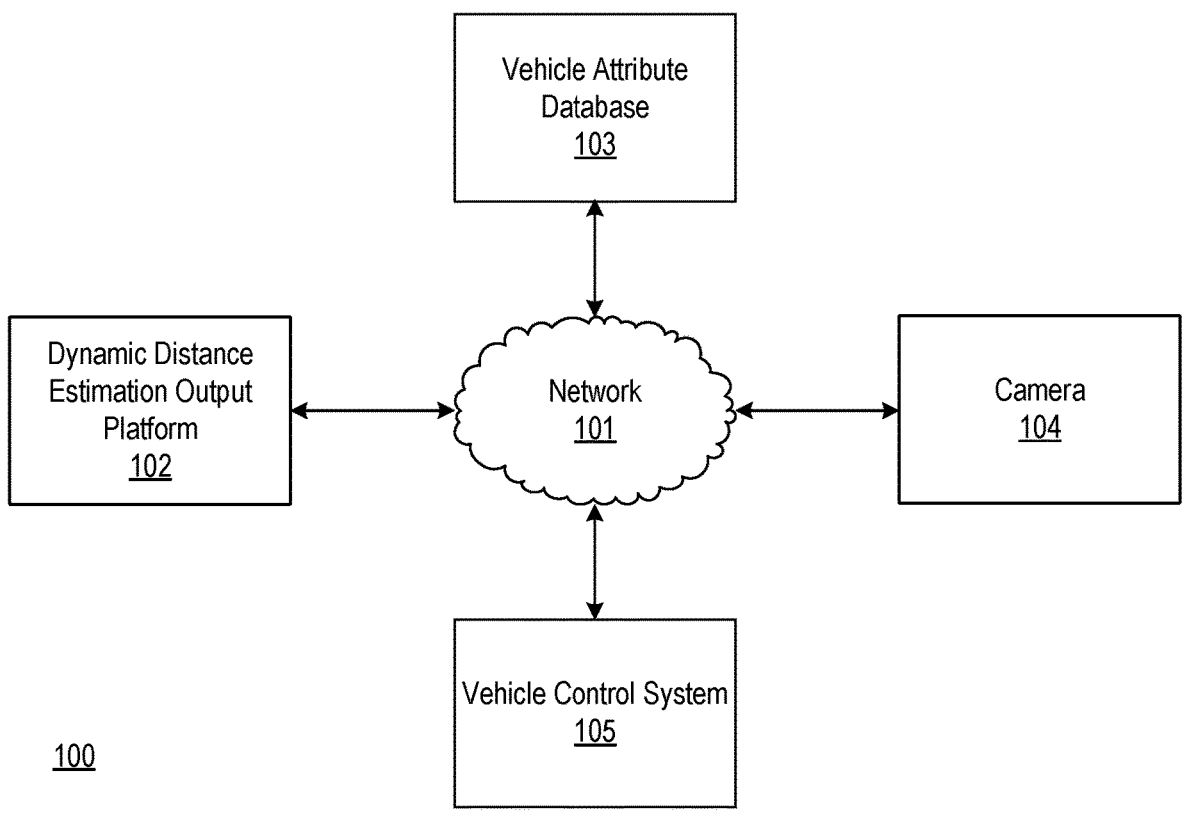
FIGS. 1A-1B depict an illustrative computing environment for deploying a dynamic distance estimation output platform that utilizes improved computer vision and perspective transformation techniques in accordance with one or more example arrangements discussed herein.
Figure 1B:
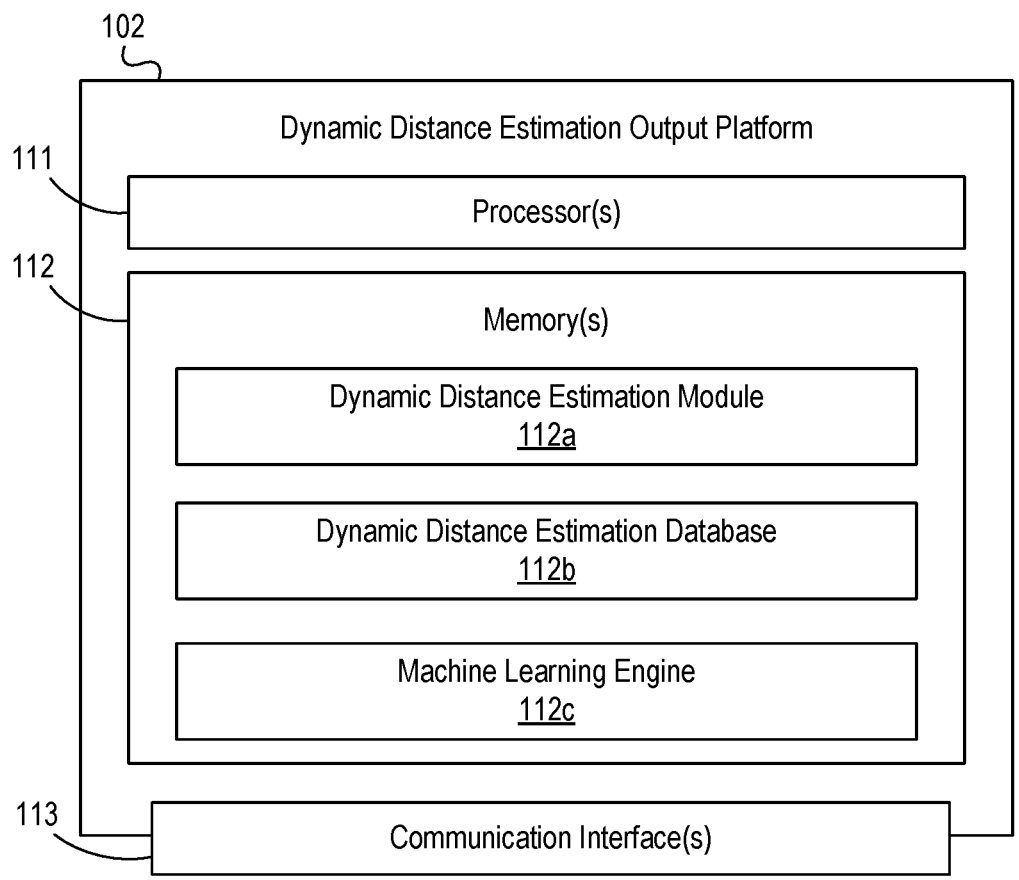

FIGS. 1A-1B depict an illustrative computing environment for deploying a dynamic distance estimation output platform 102 that utilizes improved computer vision and perspective transformation techniques in accordance with one or more example embodiments. Referring to FIG. 1A, computing environment 100 may include one or more computer systems. For example, computing environment 100 may include a dynamic distance estimation output platform 102, a vehicle attribute database 103, one or more cameras (e.g., camera 104, and a vehicle control system 105.

As illustrated in greater detail below, dynamic distance estimation output platform 102 may include one or more computing devices configured to perform one or more of the functions described herein. For example, dynamic distance estimation output platform 102 may include one or more computers (e.g., laptop computers, desktop computers, servers, server blades, or the like) configured to receive images and/or video footage and generate dynamic distance estimation outputs accordingly.

Vehicle attribute database 103 may be a computing platform capable of storing and maintaining attributes (e.g., operating parameters, dimensions, or the like) corresponding to various vehicles. In some instances, the vehicle attribute database 103 may be configured to receive requests for vehicle attributes from the dynamic distance estimation output platform 102, determine the corresponding attributes, and send the attributes to dynamic distance estimation output platform 102.

Camera 104 may be a vehicle camera or a camera on a personal computing device (e.g., smartphone, personal digital assistant, tablet computer, or the like). In some instances, camera 104 may be located in a vehicle corresponding to or including the dynamic distance estimation output platform 102 (e.g., an ego-vehicle). In some instances, the camera 104 may be a forward facing camera, a rear facing camera, and or a side facing camera. In some instances, there may be more than one camera. For example, video footage may be captured using a dash board vehicle camera and a camera on a mobile device. In some instances, the camera 104 may be mounted in the vehicle and may rotate automatically or manually. In some instances, the camera 104 may be mounted in the vehicle above the dashboard so that the camera has visibility to a scene in front of the vehicle. In one or more instances, the camera 104 may be a visible light camera.

Vehicle control system 105 may be a computing device (e.g., a desktop computer, laptop computer, tablet computer, smart phone, or the like) that may be used to receive distance estimation outputs from the dynamic distance estimation output platform 102 and to control the ego-vehicle accordingly. In some instances, and as described further below, vehicle control system 105 may be an autonomous vehicle control system. It should be understood, however, that the vehicle control system 105 is not limited to being an autonomous vehicle control system, and rather it may be a control system for a non-autonomous vehicle.

In addition, and as illustrated in greater detail below, vehicle control system 105 may be configured to generate, host, transmit, and/or otherwise provide one or more graphical user interfaces (which may, e.g., cause one or more other computer systems to display and/or otherwise present the one or more graphical user interfaces). In some instances, the graphical user interfaces generated by vehicle control system 105 may indicate a proximity to a nearby vehicle, and may be displayed via a display in the ego-vehicle or a mobile device.

Computing environment 100 also may include one or more networks, which may interconnect one or more of dynamic distance estimation output platform 102, vehicle attribute database 103, camera 104, and vehicle control system 105. For example, computing environment 100 may include a network 101 (which may connect, e.g., dynamic distance estimation output platform 102, vehicle attribute database 103, camera 104, and vehicle control system 105).

In one or more arrangements, dynamic distance estimation output platform 102, vehicle attribute database 103, camera 104, vehicle control system 105, and/or the other systems included in computing environment 100 may be any type of computing device capable of receiving a user interface, receiving input using the user interface, and communicating the received input to one or more other computing devices as discussed more fully herein. For example, dynamic distance estimation output platform 102, vehicle attribute database 103, camera 104, vehicle control system 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components configured to perform aspects described herein. As noted above, and as illustrated in greater detail below, any and/or all of dynamic distance estimation output platform 102, vehicle attribute database 103, camera 104, and vehicle control system 105 may, in some instances, be special-purpose computing devices configured to perform specific functions.

Referring to FIG. 1B, dynamic distance estimation output platform 102 may include one or more processors 111, memory 112, and communication interface 113. A data bus may interconnect processor 111, memory 112, and communication interface 113. Communication interface 113 may be a network interface configured to support communication between dynamic distance estimation output platform 102 and one or more networks (e.g., network 101, or the like). Memory 112 may include one or more program modules having instructions that when executed by processor 111 cause dynamic distance estimation output platform 102 to perform one or more functions described herein and/or one or more databases that may store and/or otherwise maintain information that may be used by such program modules and/or processor 111. In some instances, the one or more program modules and/or databases may be stored by and/or maintained in different memory units of dynamic distance estimation output platform 102 and/or by different computing devices that may form and/or otherwise make up dynamic distance estimation output platform 102. For example, memory 112 may have, store, and/or include a dynamic distance estimation module 112a, a dynamic distance estimation database 112b, and a machine learning engine 112c. Dynamic distance estimation module 112a may have instructions that direct and/or cause dynamic distance estimation output platform 102 to execute advanced computer vision and perspective transformation methods for determining distance estimation outputs, as discussed in greater detail below. Dynamic distance estimation database 112b may store information used by dynamic distance estimation module 112a and/or dynamic distance estimation output platform 102 in distance estimation output generation and/or in performing other functions. Machine learning engine 112c may have instructions that direct and/or cause the dynamic distance estimation output platform 102 to perform dynamic distance estimation output generation and to set, define, and/or iteratively refine optimization rules and/or other parameters used by the dynamic distance estimation output platform 102 and/or other systems in computing environment 100.

FIGS. 2A-2D depict an illustrative event sequence for deploying a dynamic distance estimation output platform that utilizes improved computer vision and perspective transformation techniques in accordance with one or more example embodiments. This illustrative event sequence depicts a method that is based on perspective transformations. The distances may be estimated with respect to a vehicle that has a camera (e.g., camera 104) mounted to a vehicle (here on referred to as the ego-vehicle). The method assumes that the camera 104's focal length and the camera 104's height above ground are previously determined. Similarly, the method assumes that the camera 104's pan and roll angles are close to zero, which may make the camera 104's image plane parallel to the front axle of the ego-vehicle and thus may provide a good referential plane representing the ego-vehicle.

Figure 2A:
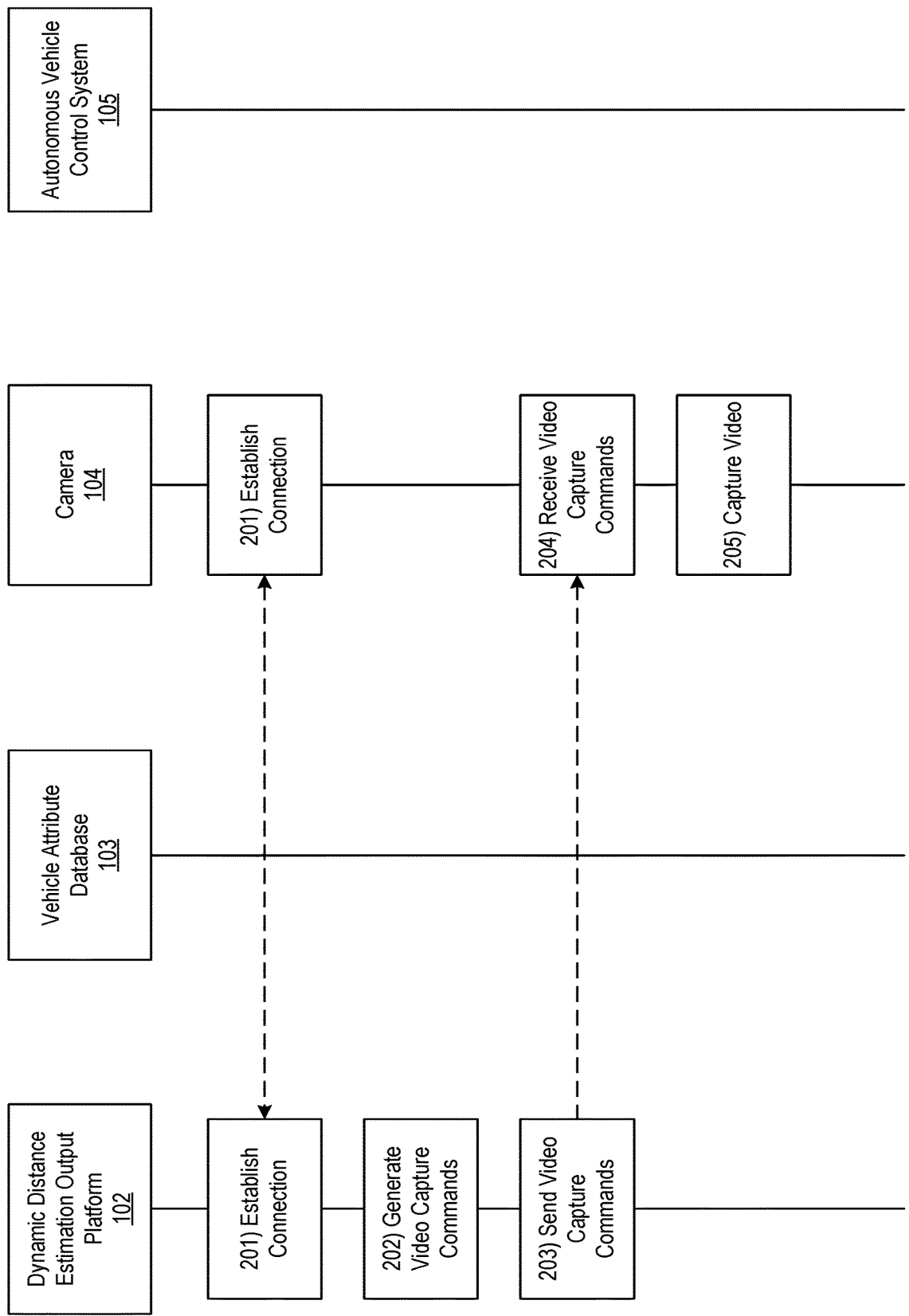
FIGS. 2A-2D depict an illustrative event sequence for deploying a dynamic distance estimation output platform that utilizes improved computer vision and perspective transformation techniques in accordance with one or more example arrangements discussed herein.

Referring to FIG. 2A, at step 201, the dynamic distance estimation output platform 102 may establish a connection with the camera 104. For example, the dynamic distance estimation output platform 102 may establish a first wireless data connection to the camera 104 to link the dynamic distance estimation output platform 102 to the camera 104.

At step 202, the dynamic distance estimation output platform 102 may generate one or more commands directing the camera 104 to initiate video collection. At step 203, the dynamic distance estimation output platform 102 may send the one or more commands directing the camera 104 to initiate video collection to the camera 104. In some instances, the dynamic distance estimation output platform 102 may send the one or more commands directing the camera 104 to initiate video collection via the communication interface 113 and while the first wireless data connection is established.

At step 204, the camera 104 may receive the one or more commands directing the camera 104 to initiate video collection sent at step 203. In some instances, the camera 104 may receive the one or more commands directing the camera 104 to initiate video collection while the first wireless data connection is established.

At step 205, the camera 104 may capture video of a vehicle (from here on referred to as the leader vehicle) located in front of the ego-vehicle. In one or more instances, the camera 104 (mounted on the ego-vehicle) may capture images of the leader vehicle.

Figure 2B:
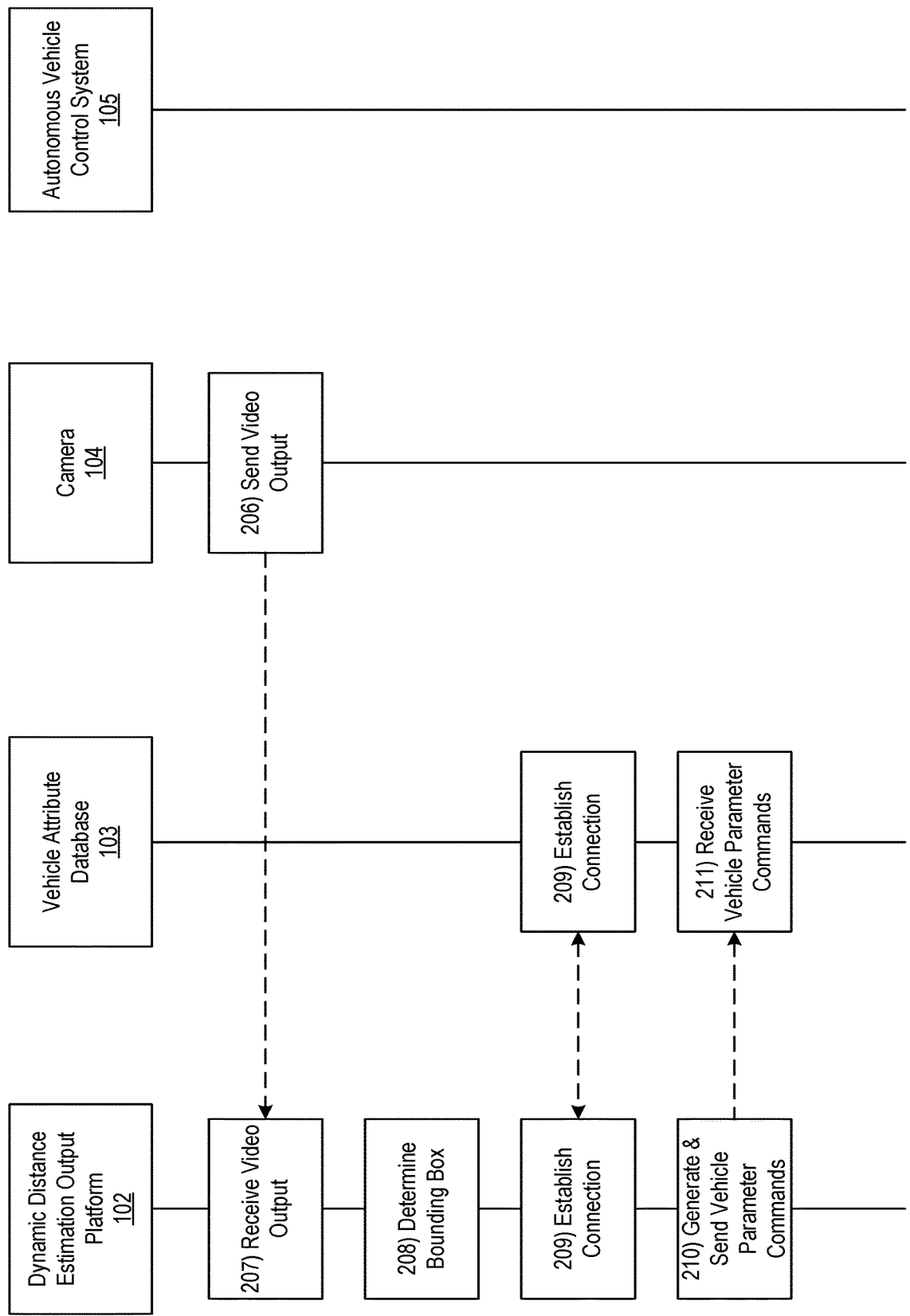

Referring to FIG. 2B, at step 206, the camera 104 may send a video output based on the captured video to the dynamic distance estimation output platform 102. For example, camera 104 may send the video footage to the dynamic distance estimation output platform 102 while the first wireless data connection is established.

At step 207, the dynamic distance estimation output platform 102 may receive the video output. For example, the dynamic distance estimation output platform 102 may receive the video output while the first wireless data connection is established and via the communication interface 113.

At step 208, the dynamic distance estimation output platform 102 may apply, to the video output, computer vision techniques in object detection to obtain the leader vehicle's bounding-box, which is a rectangle that not only provides the location of the leader vehicle (which can be represented by the bounding box's center of gravity), but also the perceived dimensions of the leader vehicle as they are visible to the ego-vehicle's camera (e.g., camera 104).

At step 209, the dynamic distance estimation output platform 102 may determine whether the leader vehicle is an oversized vehicle (e.g., truck, bus, or the like). If so, the dynamic distance estimation output platform 102 may establish a connection with the vehicle attribute database 103. In one or more instances, the dynamic distance estimation output platform 102 may establish a second wireless data connection with the vehicle attribute database 103 to link the dynamic distance estimation output platform 102 to the vehicle attribute database 103. If the dynamic distance estimation output platform 102 determines that the leader vehicle is not an oversized vehicle, it may proceed to step 215.

At step 210, the dynamic distance estimation output platform 102 may generate and send one or more commands directing the vehicle attribute database 103 to provide vehicle parameter information. In one or more instances, in sending the one or more commands, the dynamic distance estimation output platform 102 may include an indication of the leader vehicle's type. In one or more instances, the dynamic distance estimation output platform 102 may send the one or more commands directing the vehicle attribute database 103 to provide the vehicle parameter information to the vehicle attribute database 103 while the second wireless data connection is established.

At step 211, the vehicle attribute database 103 may receive the one or more commands directing the vehicle attribute database 103 to provide the vehicle parameter information that was sent at step 210. In one or more instances, the vehicle attribute database 103 may receive the one or more commands directing the vehicle attribute database 103 to provide the vehicle parameter information while the second wireless data connection is established.

Figure 2C:
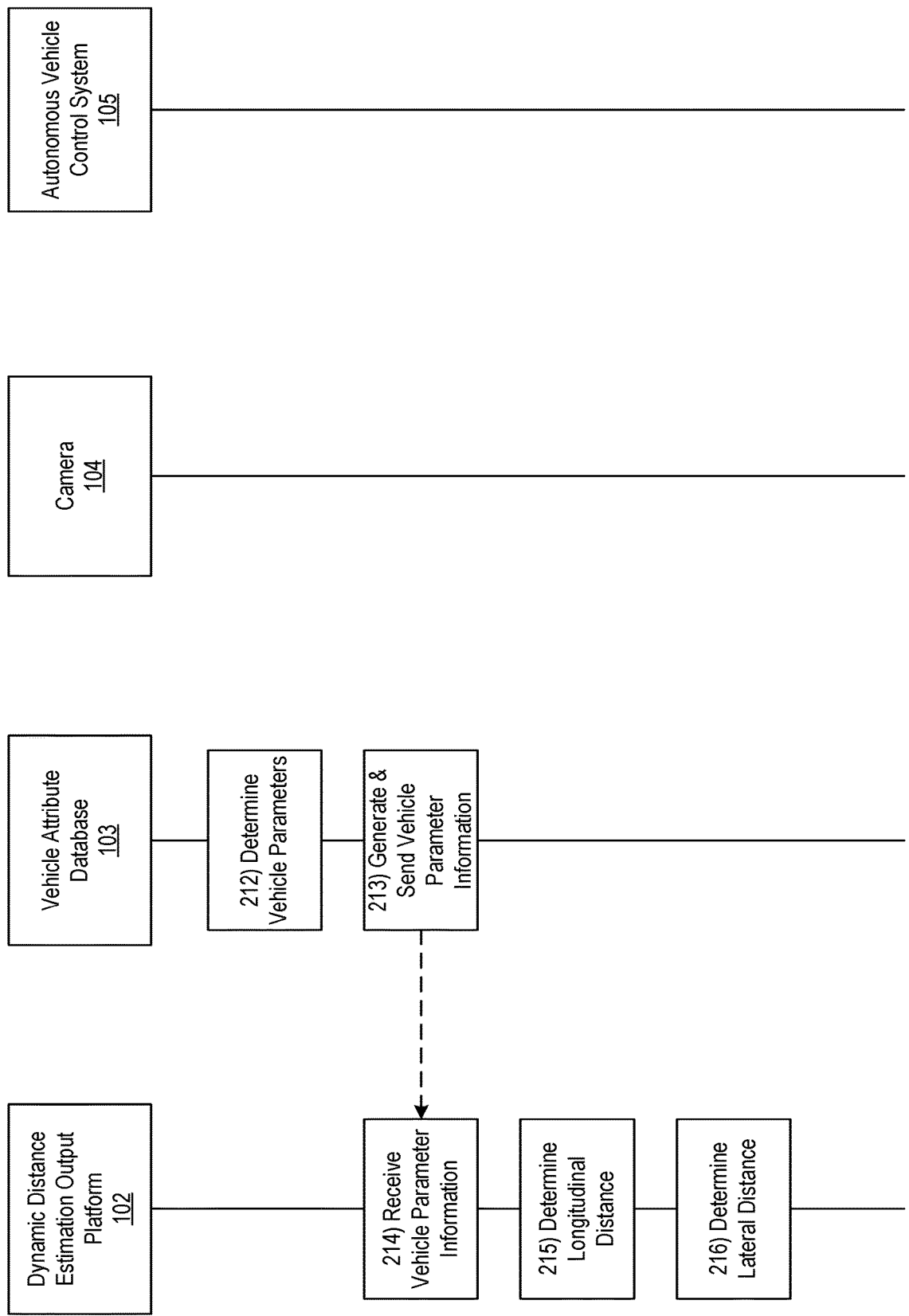

Referring to FIG. 2C, at step 212, the vehicle attribute database 103 may determine parameters (e.g., dimensions, measurements, or the like) corresponding to the leader vehicle's vehicle type. In one or more instances, the vehicle attribute database 103 may maintain a stored listing of vehicle parameters corresponding to various vehicle types, and may index the vehicle type to determine the corresponding parameters.

At step 213, the vehicle attribute database 103 may send vehicle parameter information corresponding to the parameters determined at step 212. In one or more instances, the vehicle attribute database 103 may send the vehicle parameter information to the dynamic distance estimation output platform 102 while the second wireless data connection is established.

At step 214, the dynamic distance estimation output platform 102 may receive the vehicle parameter information sent at step 213. In one or more instances, the dynamic distance estimation output platform 102 may receive the vehicle parameter information while the second wireless data connection is still established.

At step 215, the dynamic distance estimation output platform 102 may determine whether a longitudinal and a lateral distance should be determined. If so, the dynamic distance estimation output platform 102 may skip the remainder of step 215 and proceed to step 216. If not, the dynamic distance estimation output platform 102 may perform the remainder of step 215. In one or more instances, the dynamic distance estimation output platform 102 may determine a longitudinal distance (e.g., a real-world distance from the ego-vehicle's camera (camera 104) to the backside of the leader vehicle). If the dynamic distance estimation output platform 102 determines that the leader vehicle is in front of the ego-vehicle, but is off center, the dynamic distance estimation output platform 102 may determine that a lateral distance may also be determined and may skip step 215 and proceed to step 216.

Figure 3:
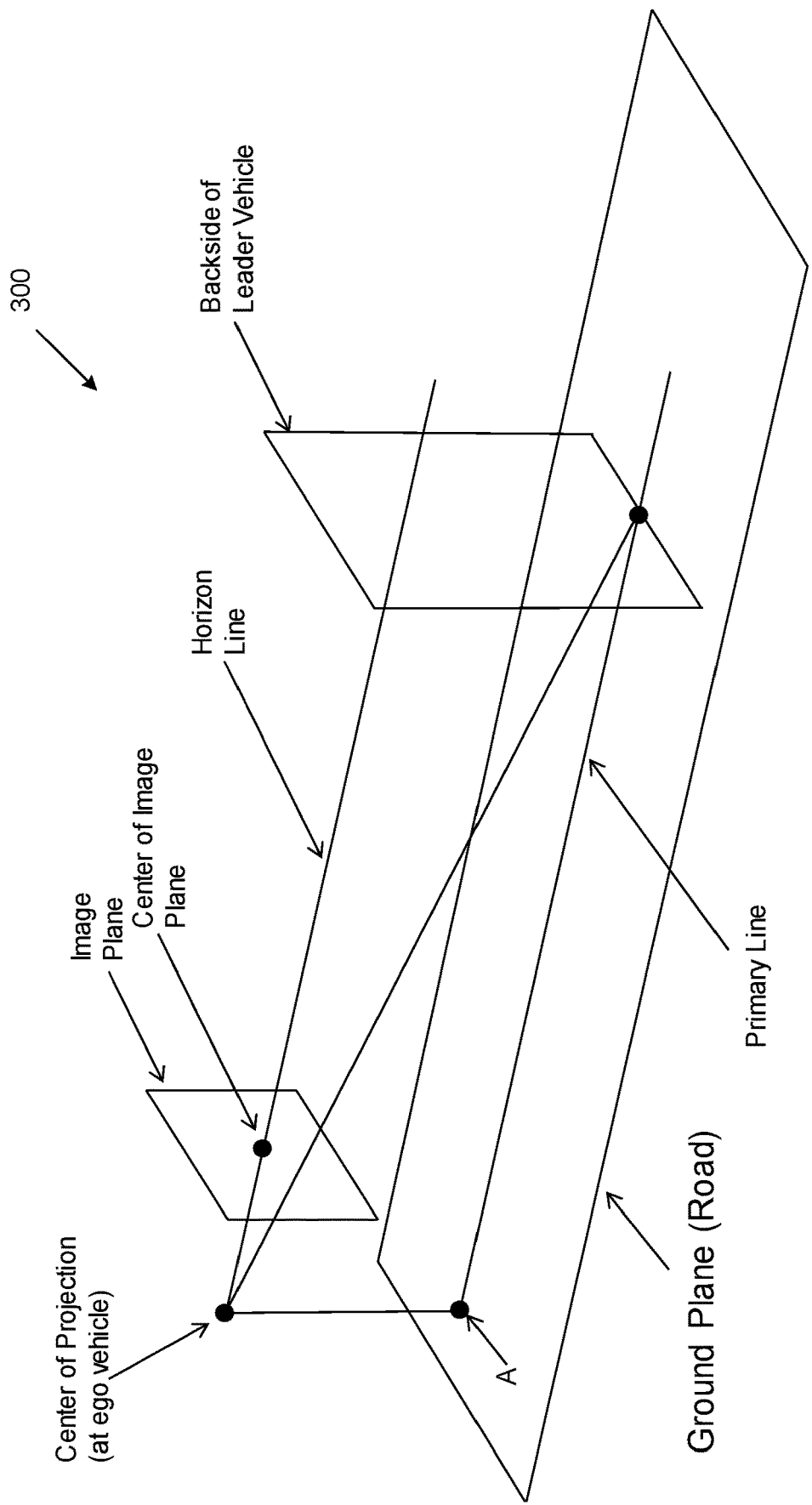
FIGS. 3-5 depict distance calculations by a dynamic distance estimation output platform that utilizes improved computer vision and perspective transformation techniques in accordance with one or more example arrangements discussed herein.

In one or more instances, the dynamic distance estimation output platform 102 may determine the longitudinal distance by measuring the orthogonal distance between the projection, over the ground plane, of the camera 104's center-of-projection and the intersection of the plane representing the leader vehicle's backside with the ground plane (referred to here on as the leader vehicle's backside plane). The camera 104's location is represented by the center-of-projection. The line that starts at the center-of-projection and that runs parallel to the ground plane is called the horizon line. In instances where the camera 104's tilt angle is zero, the horizon line is orthogonal to the image plane and it intercepts this plane at the center. For a non-zero tilt angle, the intercept may occur at the vanishing point (which may be above or below the center of the image frame depending on the tilt). The projection, over the ground plane, of the camera 104's center-of-projection may be referred to from hereon as Point A. The line which starts at Point A and runs parallel to the horizon line will be referred to as the primary line. This is illustrated further in sketch 300, which is depicted in FIG. 3.

In one or more instances, the leader vehicle's backside plane may be parallel to the camera 104's image plane. Accordingly, the dynamic distance estimation output platform 102 may determine that the ego and leader vehicles have the same heading. In one or more instances, the dynamic distance estimation output platform 102 may determine a small estimation error based on small variations on both vehicles headings.

Figure 4:
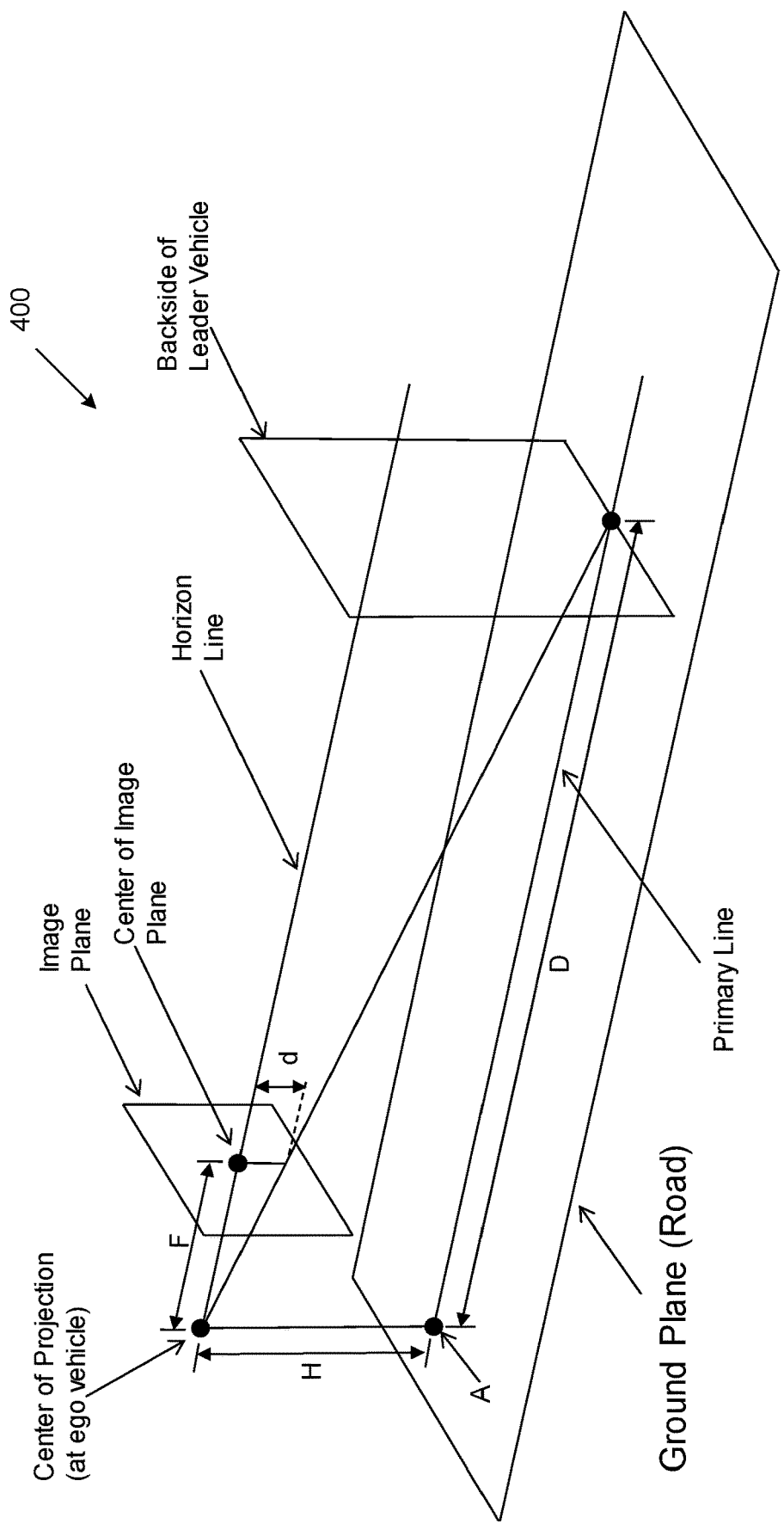

In order to determine the real-world longitudinal distance, the dynamic distance estimation output platform 102 may use information from an image frame of the video output obtained by the camera 104. In one or more instances, the dynamic distance estimation output platform 102 may apply perspective transformation calculations, allowing it to use the dimensions in pixels of different objects detected on the image frame and use them to estimate their corresponding real-world dimensions. The real-world longitudinal distance may be estimated by equation 1 below, and the estimation process is further illustrated in sketch 400, which is shown in FIG. 4.

$$D = \frac{FH}{d} \quad (1)$$

In equation 1, F represents the camera 104's focal length measured in pixels, H represents the camera 104's height above the ground plane (in feet or inches). Variable d represents the distance in pixels between the image-frame's vanishing point and the bottom of the leader vehicle's bounding box generated by the object detector. In one or more instances, the dynamic distance estimation output platform 102 may determine that the bottom segment of the bounding box's rectangle accurately approximates the location of the intersection between the leader vehicle's backside plane and the ground plane. In these instances, the dynamic distance estimation output platform 102 may use usual object detectors based on deep learning to determine a bounding box that covers the visible dimensions of the leader vehicle such as height and width. In one or more instances, in determining the bounding boxes, the dynamic distance estimation output platform 102 may determine bounding boxes with heights that extend from the roof of the leader vehicle to the point of contact of the wheels with the road (e.g., ground plane). While it is true that in the real world this point of contact for the wheels may be a little bit ahead of the intersection between the leader vehicle's backside plane and the ground plane, the difference is small for most four-wheel passenger vehicles. For trucks and buses this difference may be bigger, however neural network based object detectors may distinguish these types of cars and thus appropriate corrections can be made so that all estimated distances are calculated with respect to the leader vehicle's backside. In these instances, the dynamic distance estimation output platform 102 may perform the calculations based on the vehicle parameter information received at step 214.

The vanishing point mentioned above is the point where parallel lines in the real world might not be parallel when they are represented in the image frame due to perspective transformations and thus converge to a single point that becomes the vanishing point. The vanishing point may become the 2D representation of the horizon line depicted in FIG. 3 (the horizon line will be projected as a point in the image plane). Under ideal conditions, the camera 104 mounted in the dash board may have a zero tilt angle in which case the center of the image plane may be the same as the vanishing point. Under a non-zero tilt angle the vanishing point may be above or below the center of the image plane. The dynamic distance estimation output platform 102 may account for this in its calculation.

If the ego-vehicle and leader vehicle have the same heading (so the backsides for both cars are parallel to each other) then the dynamic distance estimation output platform 102 may assume that the image plane is parallel to the backside plane of the leader vehicle. In these instances, the primary line may be orthogonal to the backside plane of the leader vehicle and the longitudinal distance may be obtained over this line. FIG. 4 provides further illustration of the estimation process for longitudinal distance that is described by equation 1.

At step 216, the dynamic distance estimation output platform 102 may determine that the leader vehicle is not directly in front of the ego-vehicle and that a lateral distance should also be determined. For example, there are cases where the leader vehicle that is in front of the ego-vehicle is off the center of the image frame. In these instances, the dynamic distance estimation output platform 102 may calculate the longitudinal distance as well as the lateral distance to provide an accurate representation of the leader vehicle's positioning. The dynamic distance estimation output platform 102 may determine the lateral distance by first estimating the longitudinal distance to the backside of the leader vehicle in front of the ego-vehicle. In these instances, even though the leader vehicle is off center, the extension of the plane representing its backside intercepts the primary line at a given point which we will call point B. The distance between point A (defined above) and point B becomes the longitudinal distance. Similarly to the longitudinal distance calculation described above at step 215, the dynamic distance estimation output platform 102 may assume that the image plane and the leader vehicle's backside plane are parallel, thus making the primary line orthogonal to the backside plane.

Figure 5:
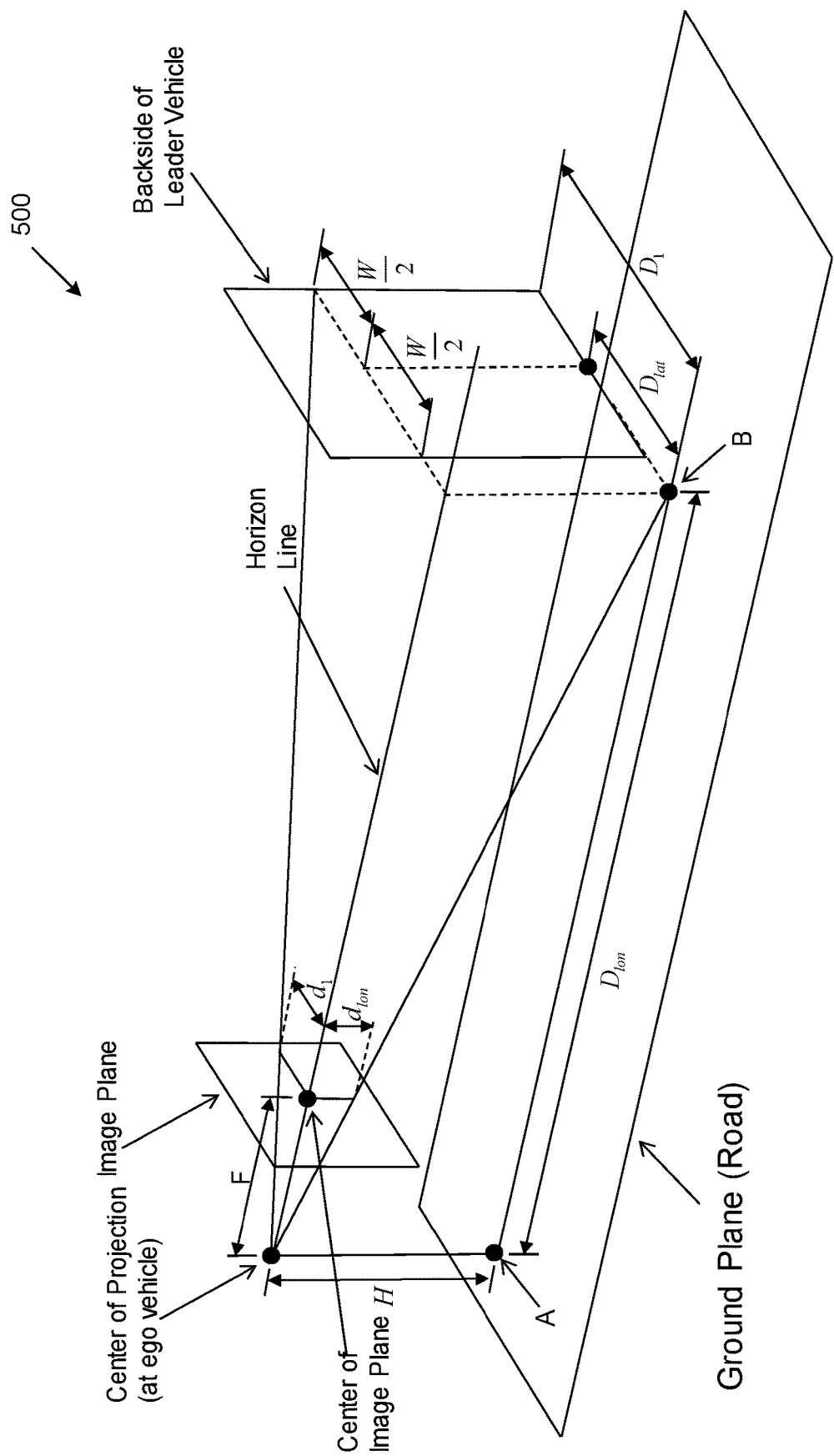

One principle that the dynamic distance estimation output platform 102 may exploit in its estimation method is the fact that horizontal lines in the 3D real-world may stay horizontal in the 2D image representation of this world (maintaining all the assumptions mentioned above). Therefore, to estimate the longitudinal distance, the dynamic distance estimation output platform 102 may obtain in the image frame the intercept point between the extension of the horizontal line corresponding to the bottom segment of the leader vehicle's bounding box generated by a deep learning object detector and the vertical line that goes through the center of the image frame. This vertical line is the 2D representation of the primary line and the intercept point just mentioned is the 2D representation of Point B. From here on, the distance between this intercept point and the vanishing point will be referred to as $d_{lon}$. This distance $d_{lon}$ may be representative of the real world longitudinal distance (referred to from here on as $D_{lon}$) between the camera 104 and the backside of the leader vehicle. Sketch 500, which is shown in FIG. 5, illustrates the lateral distance estimation process and it shows the extension of the leader vehicle's backside plane with dashed lines.

In one or more instances, the dynamic distance estimation output platform 102 may determine the real-world longitudinal distance to the leader vehicle using equation 2 below.

$$D_{lon} = \frac{FH}{d_{lon}} \quad (2)$$

The dynamic distance estimation output platform 102 may now obtain the lateral distance. For this calculation, the dynamic distance estimation output platform 102 may assume that the leader vehicle is off center towards the left of the ego-vehicle (this is illustrated in FIG. 5) and the distance designations are made in the image frame. The dynamic distance estimation output platform 102 may consider the distance between the bottom left corner of the bounding box and the 2D representation of intercept point B (referred to here on as $d_1$, which is the 2D representation of the real-world distance $D_1$).

The dynamic distance estimation output platform 102 may then assume that the real world width W of the leader vehicle is 1.8 meters (which is generally close to the true width for most passenger vehicles and can be changed to other values in case of buses and trucks). In these instances, the corresponding 2D width w of the lead vehicle may be obtained from the equation 3 (the dynamic distance estimation output platform 102 may know the longitudinal distance to the leader vehicle by applying equation 2 above).

$$w = \frac{FW}{D_{lon}} \quad (3)$$

The dynamic distance estimation output platform 102 may determine the lateral distance (referred to as $D_{lat}$), which may be obtained by subtracting from $D_1$ half the vehicle's width W. More specifically the lateral distance may be obtained using equation 4 below.

$$D_{lat} = \frac{d_1 D_{lon}}{F} - \frac{W}{2} \quad (4)$$

In one or more instances, the dynamic distance estimation output platform 102 may perform an alternate method for obtaining longitudinal distances—by using the 2D perceived width of the leader vehicle (referred to as Dalternate) as an indicator of distance. In these instances, the dynamic distance estimation output platform 102 may assume that the leader vehicle has a real-world width W equal to 1.8 m. The dynamic distance estimation output platform 102 may use equation 5 to determine the real-world distance for a perceived width w of the vehicle.

$$Dalternate = \frac{FW}{w} \quad (5)$$

Using equation 5, the dynamic distance estimation output platform 102 may build a conversion function for different perceived widths of vehicles. In these instances, the camera 104 may be a dashboard camera mounted in the ego-vehicle configured to observe marks on the pavement in front of the ego-vehicle at specific longitudinal distances from the camera 104. In these instances, the ego-vehicle may remain parked. In these instances, the video output from the camera 104 may correspond to a video of another vehicle as it moves in front of the ego-vehicle slowly going away and passing each one of the pavement markings by touching them with the back wheels. Then after processing the recorded video, the dynamic distance estimation output platform 102 may measure the width in pixels of the other vehicle at each of the distances indicated by the pavement marking where the other vehicle is located. This will provide the dynamic distance estimation output platform 102 with a function that maps vehicle widths with real world distances. Such function may be used to directly obtain longitudinal distance estimation on deployment. In some instances, this function may be used instead of or in addition to the first longitudinal distance estimation method described above. In other instances, this function may also be used as an independent method of corroboration of the accuracy of the first longitudinal distance estimation method.

Figure 2D:
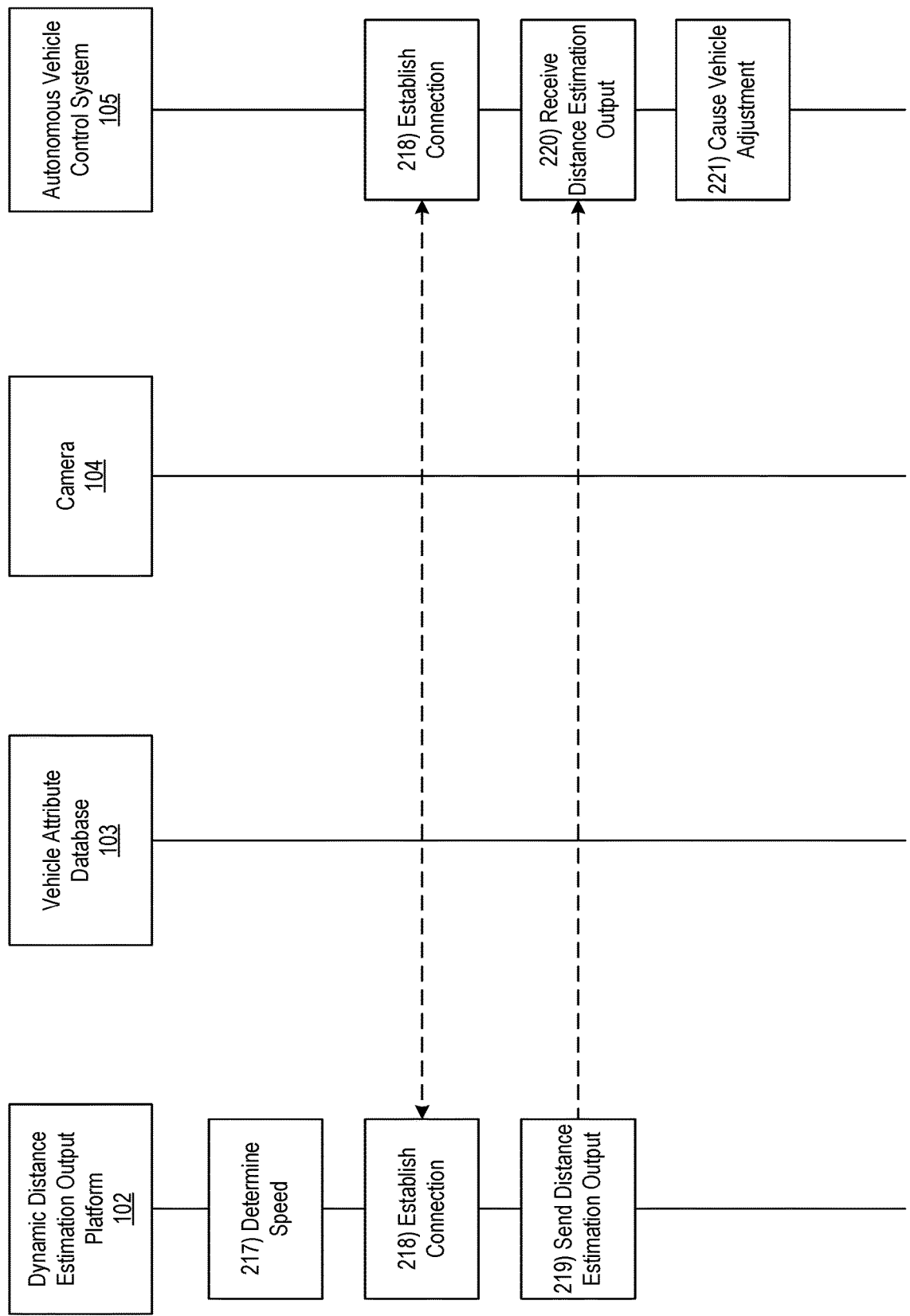

Referring to FIG. 2D, at step 217, the dynamic distance estimation output platform 102 may determine relative speeds with respect to the ego-vehicle for all the vehicles in the driving scene that are visible to the camera 104. In one or more instances, the dynamic distance estimation output platform 102 may determine the relative speed by dividing the difference in distances to any vehicle between two image frames by the time between these frames. Similarly, the dynamic distance estimation output platform 102 may determine relative accelerations for all the visible vehicles by dividing the difference between speeds at different frames by the time between frames.

Additionally, the dynamic distance estimation output platform 102 may determine absolute speed for the ego-vehicle by calculating first the distance to any static object in the driving scene on two different frames using the distance methods outlined above. Then, the dynamic distance estimation output platform 102 may divide the difference between these distances by the time between these frames. Static objects in the image frame may be public light poles, telephone poles, traffic sign poles, street sign poles, corners of buildings, or the like. In one or more instances, the dynamic distance estimation output platform 102 may detect these static objects through a variety of computer vision methods available in the literature such as deep learning methods, so long as these static objects have a point of contact with the ground plane.

At step 218, the dynamic distance estimation output platform 102 may establish a connection with autonomous vehicle control system 105. In one or more instances, the dynamic distance estimation output platform 102 may establish a third wireless data connection with the autonomous vehicle control system 105 to link the dynamic distance estimation output platform 102 with the autonomous vehicle control system 105.

At step 219, the dynamic distance estimation output platform 102 may generate a distance estimation output based on the longitudinal, lateral distances, and speeds determined at steps 215-217, and may send the distance estimation output to the autonomous vehicle control system 105. In one or more instances, the dynamic distance estimation output platform 102 may send the distance estimation output to the autonomous vehicle control system 105 while the third wireless data connection is established.

At step 220, the autonomous vehicle control system 105 may receive the distance estimation output sent at step 219. In one or more instances, the autonomous vehicle control system 105 may receive the distance estimation output while the third wireless data connection is established.

Figure 6:
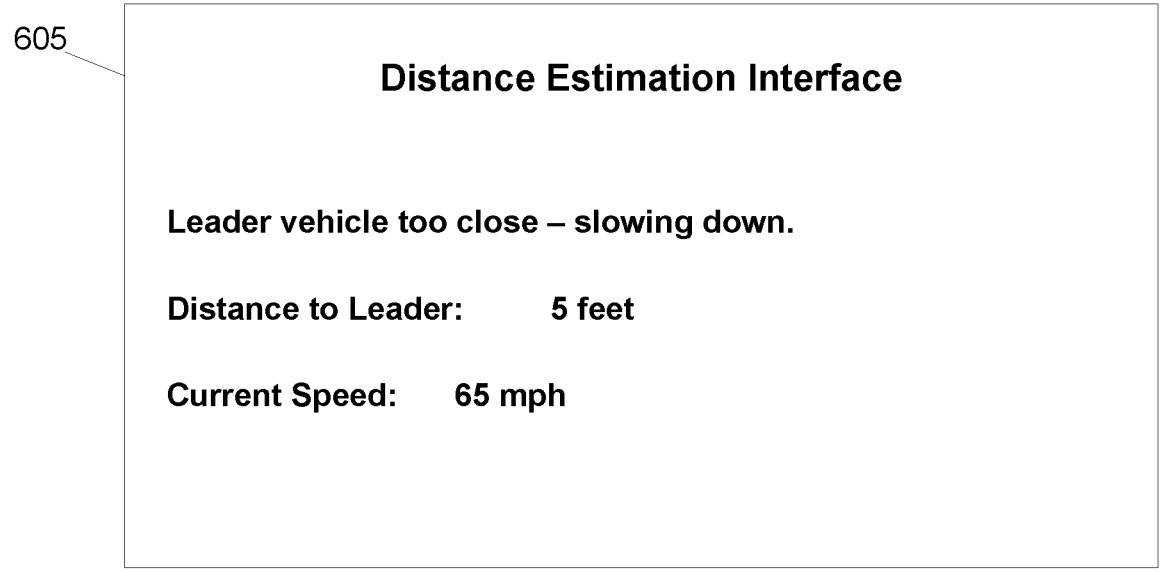
FIG. 6 depicts a graphical user interface for a dynamic distance estimation output platform that utilizes improved computer vision and perspective transformation techniques in accordance with one or more example arrangements discussed herein.

At step 221, the autonomous vehicle control system 105 may cause the ego-vehicle to maneuver (e.g., slow down, speed up, break, turn, swerve, or the like) and/or cause display of a user interface based on the distance estimation output. For example, the autonomous vehicle control system 105 may generate a graphical user interface for display on either a mobile device or a vehicle display in the ego-vehicle indicating the distance estimation output. In one or more instances, the autonomous vehicle control system 105 may generate a graphical user interface similar to graphical user interface 605, which is shown in FIG. 6. For example, the graphical user interface 605 may indicate that the ego-vehicle is slowing down due to its close proximity to the leader vehicle. The graphical user interface 605 may also indicate a distance between vehicles, a current speed, or the like.

Subsequently, the example event sequence may end, and the dynamic distance estimation output platform 102 may continue to generate distance estimation outputs in a similar manner as discussed above (e.g., by receiving video footage from a visible light camera, extrapolating information from the video footage, calculating various distances between vehicles, and providing the calculated distances to an autonomous vehicle control system). It should be understood that the method described in the example event sequence may occur in real time, and that the example event sequence may continue to repeat. By operating in this way, dynamic distance estimation output platform 102 may improve the quality of autonomous vehicle operation and increase driver safety in a cost effective manner.

Figure 7:
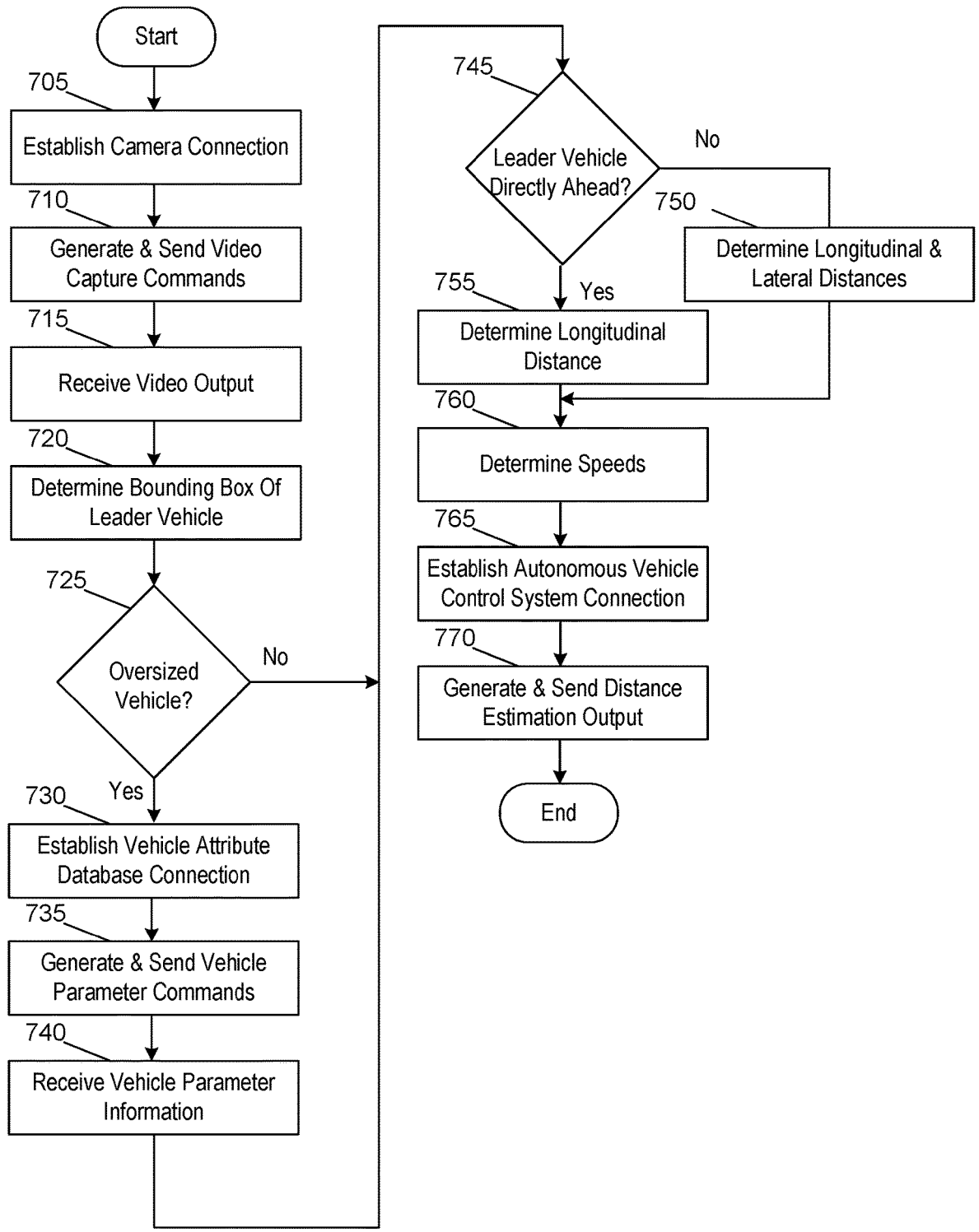
FIG. 7 depicts an illustrative method for deploying a dynamic distance estimation output platform that utilizes improved computer vision and perspective transformation techniques in accordance with one or more example arrangements discussed herein.

FIG. 7 depicts an illustrative method for deploying a dynamic distance estimation output platform that utilizes improved computer vision and perspective transformation techniques in accordance with one or more example embodiments. Referring to FIG. 7, at step 705, a computing platform may establish a connection with a video camera. At step 710, the computing platform may generate one or more commands directing the video camera to capture video footage, and may send the one or more commands to the video camera. At step 715, the computing platform may receive a video output from the video camera. At step 720, the computing platform may determine a bounding box of a leader vehicle. At step 725, the computing platform may determine whether the leader vehicle is an oversized or otherwise non-standard sized vehicle. If so, the computing platform may proceed to step 730. If not, the computing platform may proceed to step 745.

At step 730, the computing platform may establish a connection with a vehicle attribute database. At step 735, the computing platform may generate and send one or more commands directing the vehicle attribute database to provide vehicle parameter information. At step 740, the computing platform may receive vehicle parameter information from the vehicle attribute database. At step 745, the computing platform may determine whether the leader vehicle is directly ahead or is offset. If the leader vehicle is offset, the computing platform may proceed to step 750. If the leader vehicle is directly ahead, the computing platform may proceed to step 755.

At step 750, the computing platform may determine both a longitudinal and a lateral distance to the leader vehicle. At step 755, the computing platform may determine only a longitudinal distance. At step 760, the computing platform may determine speeds of the vehicles. At step 765, the computing platform may establish a connection with an autonomous vehicle control system. At step 770, the computing platform may generate and send a distance estimation output to the autonomous vehicle control system. Subsequently, the method may end.

In addition or as an alternative to the one or more methods described above, in some instances, the dynamic distance estimation output platform 102 may perform hierarchical processing through the bounding box (e.g., a deep learning bounding box). In one or more instances, the dynamic distance estimation output platform 102 may perform additional processing using the bounding box obtained through the object detector, which may extend the descriptive information on the driving scenario beyond what has been presented above and may thus extend the functionality already mentioned. In some instances, the dynamic distance estimation output platform 102 may identify a bounding box that covers the visible extent of the vehicle. In these instances, the dynamic distance estimation output platform 102 identify a bounding box that includes the back-side and one of the lateral-sides (left or right depending on a vehicle position with regards to the ego-vehicle), and points of contact of the wheels with the road (this may be visible for the two posterior wheels). Depending on the proximity to the ego-vehicle, sometimes the two wheels on the side of the vehicle may be visible (e.g., visible to the camera 104) and the points of contact with the road (ground plane) may be available for three of the vehicle wheels (the two posterior wheels and one of the front wheels). One of the hierarchical processes that may be performed by the dynamic distance estimation output platform 102 is an Alternative Lateral Distance Estimation process, which is described below.

In addition, or as an alternative method to estimate the lateral distance of the vehicle, the dynamic distance estimation output platform may resort to hierarchical processing. In these instances, the dynamic distance estimation output platform 102 may detect the vehicle through the bounding box (e.g., based on image and/or video content received from the camera 104). After detecting this box, the dynamic distance estimation output platform 102 may use a neural network trained to detect the back-side of the vehicle from Haar-like features obtained from the input image (e.g., received from the camera 104). The dynamic distance estimation output platform 102 may obtain the Haar-like features by extracting the response of the Haar-like wavelets over a window of a given size on the image. By obtaining the Haar-like wavelets, the dynamic distance estimation output platform 102 may evaluate, among other things, the presence of vertical and horizontal bars on the back-side of the vehicle and a symmetric arrangement for these bars.

In one or more instances, the actual size of the vehicle in the image plane depends on the real-world proximity to the ego-vehicle. Therefore, in these instances, the back-side of the vehicle may have different sizes, however, the size of the window used by the dynamic distance estimation output platform 102 to extract the Haar-like features for the neural network may be unique. Accordingly, the problem of having a variable size window for the vehicle back-side may solved by extracting, by the dynamic distance estimation output platform 102, multiple window sizes from the input image and by resizing such image through sampling and interpolation to one unique size, which may be the nominal window size that was used to train the neural network. The neural network may trained with different window sizes, which may allow the dynamic distance estimation output platform 102 to perform successful detection even though the vehicle actual size on the image may be variable. The windows used to train the neural network may be rectangular with different aspect ratios. Additionally, the neural network may work as a classifier that provides a one if a vehicle back-side is detected and a zero if no back-side is detected.

Figure 8:
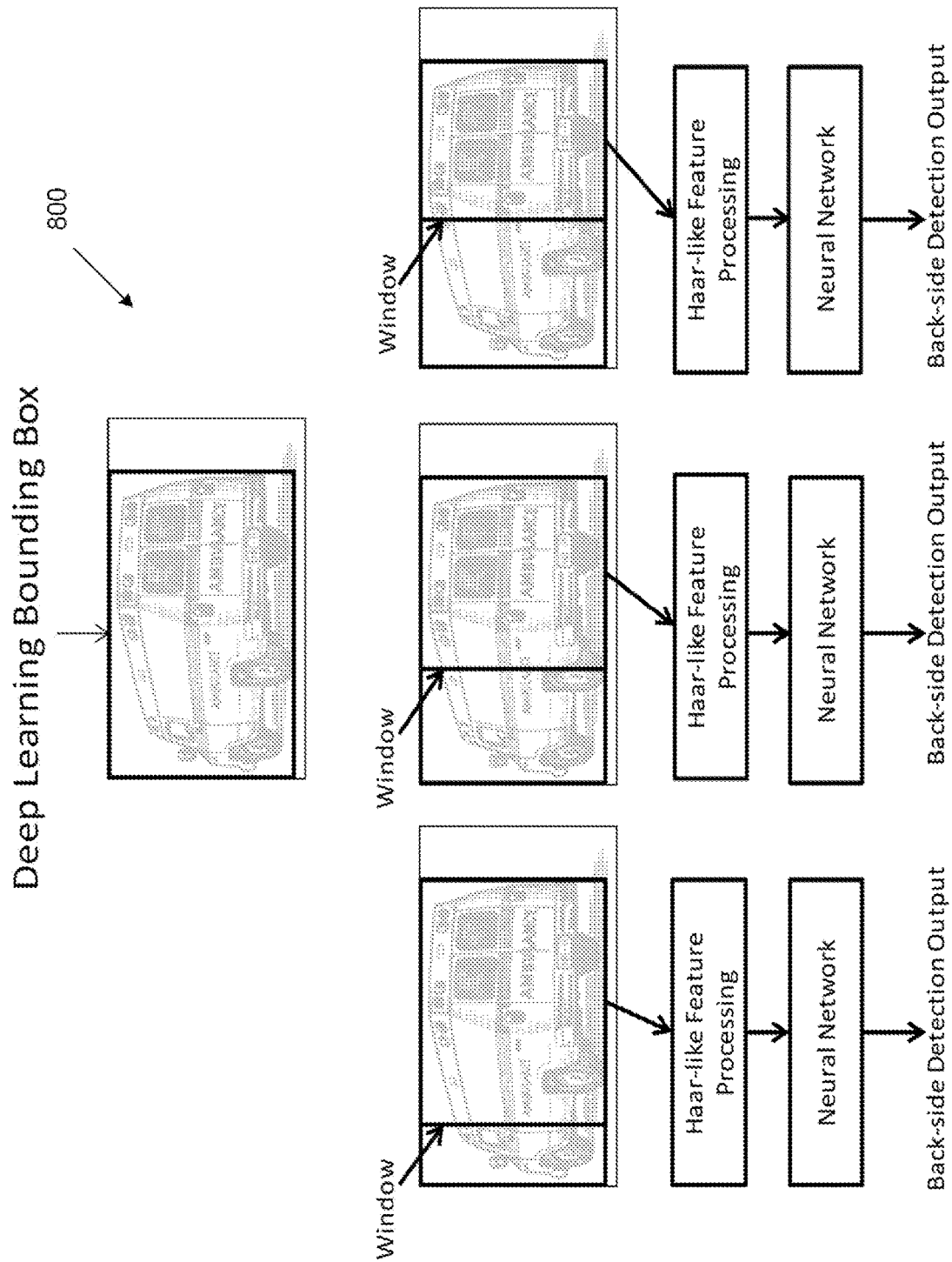
FIGS. 8-17 depict illustrations associated with deploying a dynamic distance estimation output platform that utilizes improved computer vision and perspective transformation techniques in accordance with one or more example arrangements discussed herein.

The dynamic distance estimation output platform 102 may use the neural network trained on the vehicle back-side appearance within the bounding box by extracting an image window from it. In the description below, it may be assumed that the vehicle that was detected, by the dynamic distance estimation output platform 102 using the deep learning bounding box, is moving in the same direction as the ego-vehicle (e.g., so that its back-size is visible and that this vehicle is located on the adjacent lane to the right of the ego-vehicle, which is shown, for example, in FIG. 8). In one or more instances, this window to be used for the neural network detection may be located towards the right side of the bounding box and it may extend in length towards the left side of the bounding box according to a predetermined size (e.g., so that a given aspect ratio is obtained for this window). Thus, the window may share the same right border with the bounding box's left border (e.g., FIG. 8 shows three instances of this window and, as illustrated, the window shares the same right border with the deep learning bounding box). The dynamic distance estimation output platform 102 may then re-size the extracted window and its image content (e.g., through sampling and interpolation) to the common image size used by the neural network. In the next step, the dynamic distance estimation output platform 102 may process the re-sized image so that Haar-like feature responses may be obtained from it and these responses may be fed to the neural network. In some instances, the neural network may generate and output values providing an indication on the presence of the back-size of the vehicle in the re-sized image. Additionally or alternatively, another window for back-side vehicle detection may be generated by the dynamic distance estimation output platform 102. The dynamic distance estimation output platform 102 may extract this second window from the object detector's bounding box starting on the right-side of the bounding box and taking a different length than the one taken for the first window so that a different aspect ratio is obtained. The dynamic distance estimation output platform 102 may then re-size this second window to the common size and process it for Haar-like feature extraction. The dynamic distance estimation output platform 102 may then feed the Haar-like feature responses to the trained neural network to obtain a second neural network response. The dynamic distance estimation output platform 102 may continue this process by extracting a third and a fourth window (e.g., several windows may be obtained) from the bounding box so that different window sizes with different aspect ratios are obtained and processed through the neural network. The window that is selected (e.g., by the dynamic distance estimation output platform) as the one that best fits the vehicle back-side may be the one that provided the strongest neural network output response (the one closest to one).

In some instances, once the best back-size window is detected within the bounding box, the dynamic distance estimation output platform 102 may use the width of this window as a reference to perform lateral distance estimation calculations. In these instances, the width of the best back-side window may represent the width of the vehicle. In some instances, the dynamic distance estimation output platform 102 may use the right-side corner of this window as a reference point to perform lateral distance calculation. The lateral distance calculation described above relied on a vehicle real-world width estimation of 1.8 m. In contrast, in the current lateral distance estimation method, the dynamic distance estimation output platform 102 might not make this assumption since it may identify the actual vehicle width detected inside the bounding box. In some instances, the actual real width of the vehicle may be calculated as follows:

$$Wreal = \frac{D_{lon}}{F}(db_1 - db_2) \qquad (6)$$

In the above equation $D_{lon}$ is the real world distance from the camera (e.g., camera 104) to the bottom of the deep learning bounding box (calculation of this value is described further above), F is the camera's focal length, $db_1$ is the orthogonal distance in pixels from one of farthest edge of the back-side window (detected by the neural network as described above) to the image representation of the primary line (the real-world primary line was introduced with regard to FIG. 3 above) and $db_2$ is the orthogonal distance of the closest edge of the back-side window to the image representation of the primary line. This Wreal can be interexchanged for W in equation (4) above.

With regards to the previous assumption about the detected vehicle being on the adjacent lane to the right of the ego-vehicle, the dynamic distance estimation output platform 102 may also assume that such vehicle is located on the adjacent lane to the ego-vehicle's left. In these instances, the same method described above applies with the modification that the windows being extracted from the bounding box (e.g., by the dynamic distance estimation output platform) may be located to the left side of the bounding box. Whether a vehicle is towards the left side or the right side of the ego-vehicle may be determined, by the dynamic distance estimation output platform 102, by evaluating the position of the bonding box's center of gravity and its position with respect to the vanishing point in the image. In some instances, if the dynamic distance estimation output platform 102 determines that the center of gravity is located to the left of the vanishing point, then the detected vehicle may be deemed to be over the left, and conversely to the right if the center of gravity is located to the right of the vanishing point. In some instances, for vehicles that are in front of the ego-vehicle, the above lateral distance method might not apply (e.g., because the vehicle is in front). Whether the dynamic distance estimation output platform 102 determines that the detected vehicle is in front of the ego-vehicle or located towards one of the sides of the ego-vehicle may be based on a threshold for the distance between the bounding box's center of gravity and the vanishing point. The dynamic distance estimation output platform 102 may apply this threshold for example in these situations where the vehicle in front is making a lane change and therefore a lateral distance is needed on the calculations.

The dynamic distance estimation output platform 102 may applied the procedure described above to detection of front-side of the vehicle as well. In these instances, the neural network may be trained to detect front-side instead of back-side. The dynamic distance estimation output platform 102 may apply the same method for extracting windows within the bounding box. These cases may be relevant for driving scenarios where the road is divided in two lanes (e.g., with one lane for one traffic direction and the other lane for opposite direction). In these instances, the vehicles coming on the opposite direction in the adjacent lane may have their front-side visible to the ego-vehicle, while their back-side is hidden from view. The same methodology described above may be applied, by the dynamic distance estimation output platform 102, to determine lateral distance by exploiting the knowledge of the detected vehicle's width.

An important consideration with regards to the method mentioned above is the fact that the processing by the dynamic distance estimation output platform 102 may be hierarchical. In these instances, the deep learning detection of the vehicle by the dynamic distance estimation output platform may happen first, which may provide the vehicle's bounding box. Then the detection of the back-side (or front-side) of the vehicle by the dynamic distance estimation output platform 102 may happen second. In some instances, the search space for the windows to be used on the neural network trained to detect back-sides (or front-sides) may be limited and contained inside the bounding box, which may speed-up processing when compared to the alternative of searching for back-side of vehicles in the whole image. Not only fast processing is obtained as a result of this hierarchical processing, but also greater accuracy since the deep-learning detection provides a high confidence that the image content inside will correspond and contain a vehicle's back-side (or front-side) as opposed to a free-floating whole image search that could produce several vehicle back-side false positives. These advantages of hierarchical processing couples with the perspective transformation methodologies provided in this patent allow for accurate lateral distance estimations for all detected vehicles. An illustrative diagram of hierarchical processing is shown in graphic 800, which is illustrated in FIG. 8.

Figure 9:
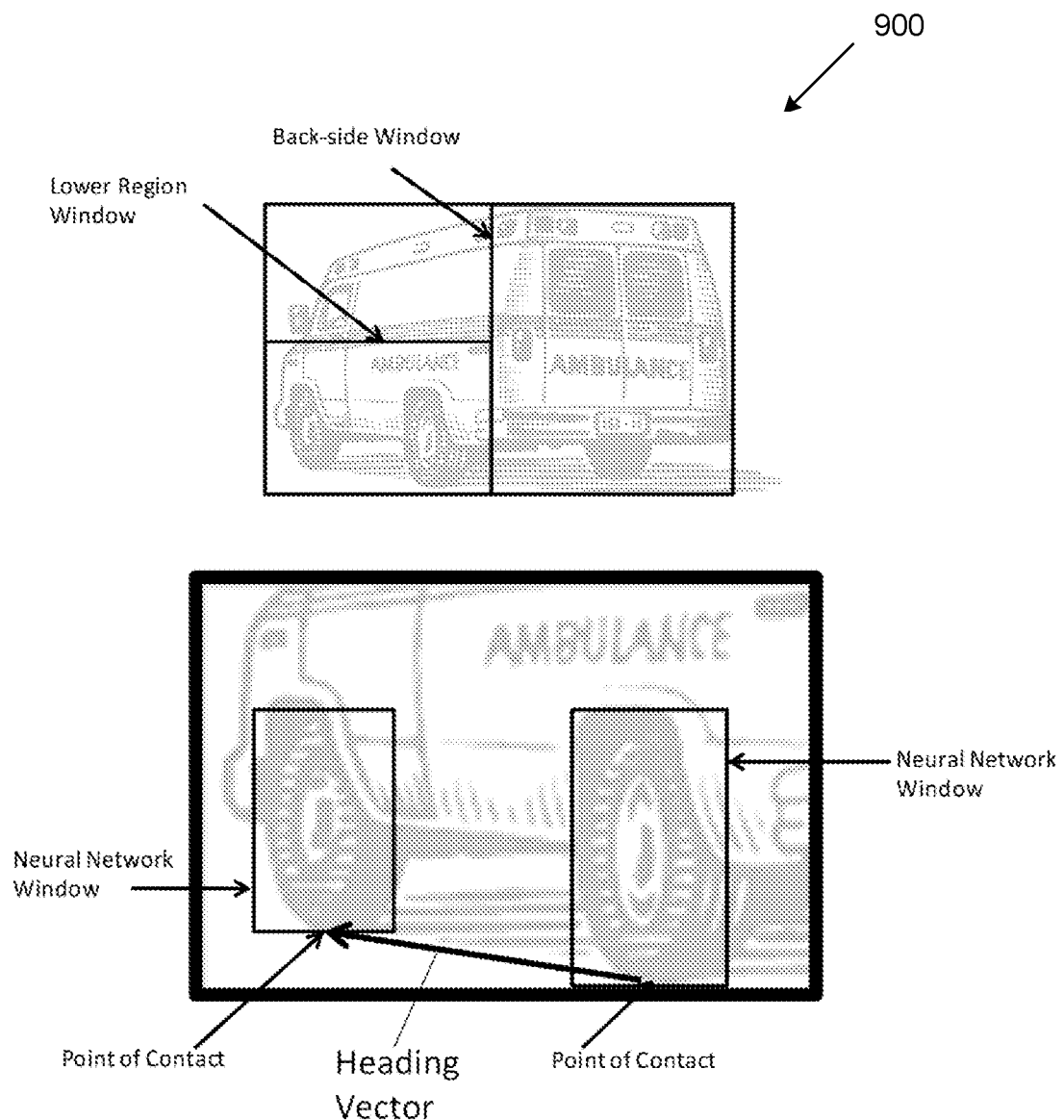

Another capability of the dynamic distance estimation output platform 102, described herein, that exploits the deep learning bounding-box detection coupled with hierarchical processing and the perspective transformation methodology, is the determination of vehicle heading for all vehicles detected in the field of view for the camera (e.g., the camera 104). In these instances, the dynamic distance estimation output platform 102 may take advantage of the visibility of the vehicle's wheels when the vehicle is located towards the left or towards the right of the ego-vehicle (e.g., vehicles in front of the ego-vehicle are deemed to have the same heading as the ego-vehicle). As previously described, when the vehicle is to the right of the ego-vehicle, for example, three of the vehicle's wheels may be visible (e.g., to the camera 104) and particularly the two wheels on the left side of such vehicle (e.g., excluding occlusion situations). In these instances, a neural network trained to detect wheels may be used by the dynamic distance estimation output platform 102 to detect the locations of the each of the two wheels on the vehicle's right side. In these instances, the neural network may be trained to detect wheels by using images of wheels on the side for a diversity of vehicles at different distances from the camera 104 (e.g., there may be abundant datasets with hundreds of hours of footage of vehicles in the road filmed with dash mounted cameras). In some instances, the neural network training procedure may be performed by the dynamic distance estimation output platform 102 as mentioned above by using a common window size, which is fed to the input of the neural network. In these instances, images of wheels with different image sizes may all be re-sized, by the dynamic distance estimation output platform 102, to the common window size and the neural network may be trained with them so that detection, by the dynamic distance estimation output platform 102, of the wheel is possible (in some instances, this training may involve negative examples as well taken from the image contents of the bounding box). Once the neural network is trained the detection procedure may proceed as follows. First, the deep learning bounding box may be detected by the dynamic distance estimation output platform 102, which may use this detection as a basis to launch the neural network based wheel detection. The first step may involve the partitioning, by the dynamic distance estimation output platform 102, of the bounding box in two parts. The first part may be the bounding box's segment that corresponds to the back-side detection. The second part may be the remaining portion of the bounding box minus the first part. The second part may be divided equally, by the dynamic distance estimation output platform 102, into two regions: an upper region and a lower region. This may be done to provide some degree of image segmentation so that the dynamic distance estimation output platform 102 may more efficiently search for the wheels of the vehicle (e.g., which may be located on the lower region). FIG. 9 provides an illustration 900 of this segmentation. The next step is to scan, by the dynamic distance estimation output platform 102, this lower region by extracting square windows of different sizes and at different positions. In some instances, each window may be re-sized by the dynamic distance estimation output platform 102 to the common size window and fed to the neural network. In these instances, the two strongest responses from the scan may provide detection, for the dynamic distance estimation output platform 102, of the presence of the two wheels. In these instances, the dynamic distance estimation output platform 102 may include a minimum detection threshold for the wheel because one or both wheels may not be visible due to occlusion.

In some instances, once the wheels have been detected by the dynamic distance estimation output platform 102, the dynamic distance estimation output platform 102 may have each wheel's corresponding window location (centroid) and its size. The next step may be to determine, by the dynamic distance estimation output platform 102, the point of contact of each wheel with the road. For this purpose, the dynamic distance estimation output platform 102 may search for the surrounding area around the middle of the bottom side of the window corresponding to the neural network based wheel detection and may search for the highest brightness transition between the dark color of the wheel and the color of the road at its lowest point (e.g., lowest in this case may mean the pixel closest to the bottom of the image but also closest to the middle of the window so that the actual point of contact is considered). In practice, there may be several pixels that may show contact with the road due to image quantization effects. Nevertheless, in these instances, the pixel at the lowest point, according to the criteria mentioned above, may provide a fairly accurate representation of the point of contact between the wheel and the road. Since the dynamic distance estimation output platform 102 used the neural network trained on the outward appearance of the wheel, the point of contact detected according to the procedure mentioned above may be the one that is the most outward point (e.g., the point that is closest to the primary line) according to the visual appearance from the camera 104's point of view. Additionally, to the procedure mentioned above and as a second order approximation to the point of contact, the dynamic distance estimation output platform 102 may enforce that the point of contact be the pixel that is closest on the real-world to the primary line in addition to the criterion of being the lowest point in the image and closest to the middle of the neural network detection window. By considering multiple criteria, a score for each criterion may be generated by the dynamic distance estimation output platform 102, and the point that achieves the highest sum of the score may be selected as the point of contact. In some instances, the real world distance to the primary line may then be determined by the dynamic distance estimation output platform 102 according to the procedures mentioned above for lateral distance estimation. For instance, if the orthogonal distance in pixels from one of the points of contact to the representation of the primary line is $d_{orth}$ then its real world distance is $d_{orth-real} = D_{lon}/F \; d_{orth}$ and here $D_{lon}$ is the longitudinal distance of the point of contact (as calculated using the same procedure described in equation 1, which in the current case uses the vertical distance in the image plane between the vanishing point and the point of contact to obtain $D_{lon}$) and F is the camera's focal length. Once the dynamic distance estimation output platform 102 determines the points of contact for the wheels, it may obtain real world longitudinal and lateral distances (e.g., over the ground plane) in reference to the ego-vehicle. This may provide two vectors, each for one contact point. Therefore, in these instances, the real-world vector that connects these two contact points (e.g., which is obtained by subtracting the two vectors mentioned before) may provide the detected vehicle heading as the angle that this real-world vector makes with the ego-vehicle primary line. An illustration 900 of this processing is shown in FIG. 9. It should be noted that this heading may be relative to the actual heading of the ego-vehicle. In order to calculate the absolute heading of the detected vehicle then the dynamic distance estimation output platform 102 may add this heading angle to the ego-vehicle heading.

Figure 10:
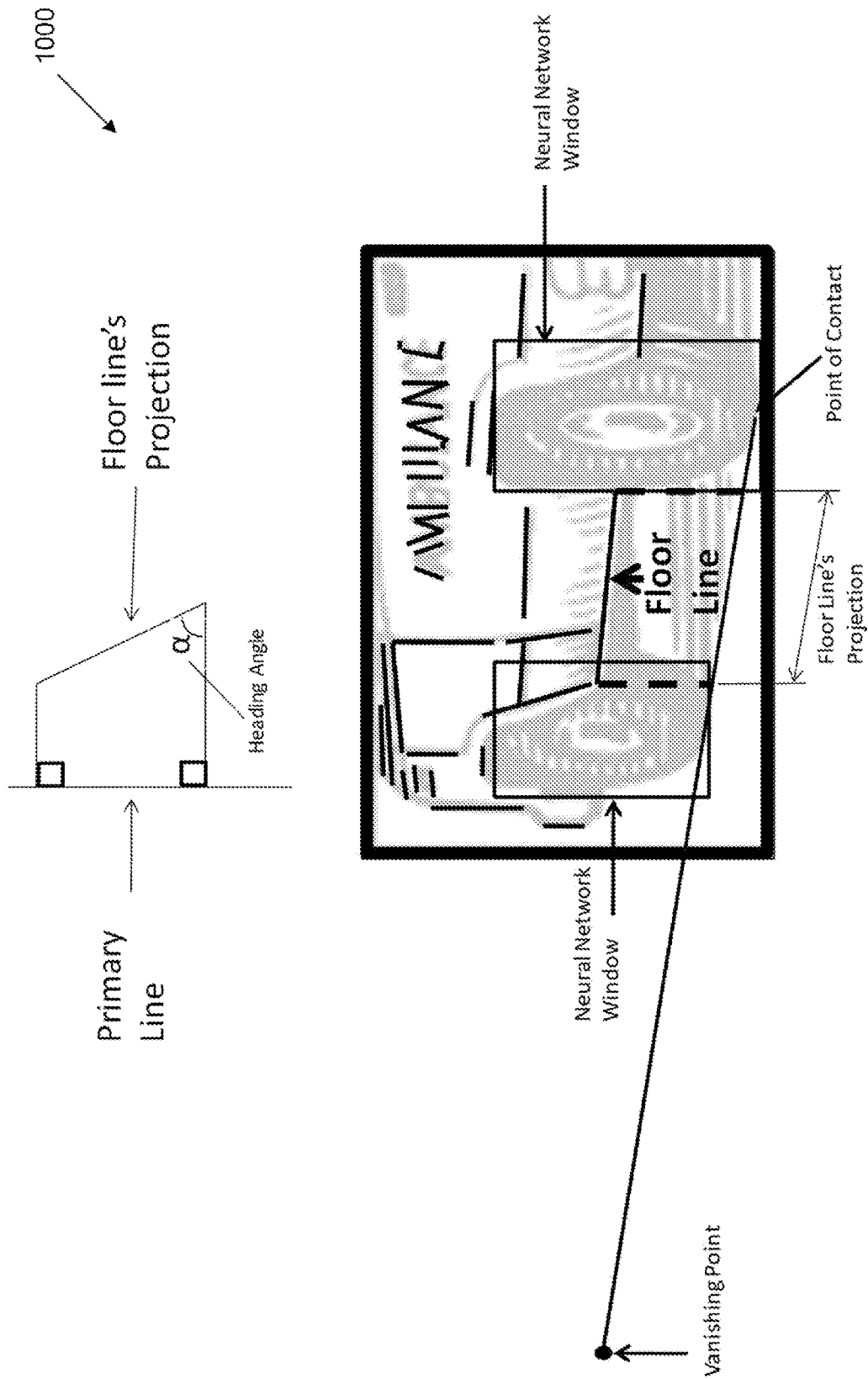

An additional benefit of the hierarchical processing presented above is the ability of the dynamic distance estimation output platform 102 to further extract vehicle information to determine its heading. In particular, the dynamic distance estimation output platform 102 may resort to the upper and the lower regions inside the bounding box as they were defined above. In these instances, the dynamic distance estimation output platform 102 may resort to a known computer vision algorithm for line detection called Line Segment Detection (LSD). By using this algorithm, the dynamic distance estimation output platform 102 may detect all possible lines within an image region. In these instances, the dynamic distance estimation output platform 102 may run the LSD algorithm on the lower region and may detect the longest non-vertical line that connects the two wheels (or their detected windows) previously detected by the neural network. In these instances, the dynamic distance estimation output platform 102 may be able to detect the vehicle's floor. In these instances, the non-vertical nature of the line can be enforced by the dynamic distance estimation output platform 102 by ensuring that the line's angle with respect to the bottom side of the image plane has a maximum absolute value, so that the dynamic distance estimation output platform 102 may consider lines that tend to be horizontal in the image plane. The floor line may have the additional attribute that this line is closest to the ground plane connecting the two wheels and the only one presenting a significant difference between the brightness above the line and below the line since the area above the line is the vehicle's frame, while the area below the line is the road (e.g., shadowed by the vehicle). In some instances, this floor line is a line detected, by the dynamic distance estimation output platform 102, in the image plane. FIG. 10 shows an illustration 1000 of the lower region inside the bounding box and of different straight lines detected by the dynamic distance estimation output platform 102 through LSD (e.g., even straight parts of non-straight lines are detected by LSD). In some instances, the real-world line representing the vehicle's floor may be reasonably assumed to be parallel to the ground plane. Accordingly, any projection of this line over the ground plane may be parallel to the floor line in the image plane. The next step is to determine, by the dynamic distance estimation output platform 102, the real-world angle of this line with respect to the ego-vehicle primary line (as shown above). Accordingly, the dynamic distance estimation output platform may find the projection of the floor line over the ground plane (e.g., the road). In this case, the dynamic distance estimation output platform 102 may resort to the point of contact for the posterior wheel of the vehicle (if this is not visible due to occlusion we can resort to the point of contact for the front wheel) which may be located on the visible side of the detected vehicle. In some instances, since the external surface of the wheel may be reasonably on the same plane as the floor line detected, by the dynamic distance estimation output platform 102, on the vehicle's frame, the dynamic distance estimation output platform 102 may use the wheel's point of contact to perform the projection of the floor line over the ground plane. In these instances, the dynamic distance estimation output platform 102 may consider the line that connects the vanishing point (e.g., in the image plane) and the wheel's point of contact. This line may be over the ground plane and it may also be on the same plane as the floor line (and parallel to it) due to the assumption described above just made. Next, the dynamic distance estimation output platform 102 may draw vertical lines (in the image plane) that go through the end-points of the floor line. The intersections between these vertical lines and the line that connects the vanishing point and the wheel's point of contact may be the projections over the ground plane of the floor line's end-points. By joining with a straight line these two projections, the dynamic distance estimation output platform 102 may obtain the projection of the floor line over the ground plane.

The final step is for the dynamic distance estimation output platform 102 to determine the real-world angle of the floor line's projection with respect to the ego-vehicle primary line (as described above). For this purpose, the dynamic distance estimation output platform 102 may compute the orthogonal distance in pixels of the end-points of the floor line's projection to the representation of the primary line (which may be a vertical line in the middle of the image frame passing through the vanishing point). The dynamic distance estimation output platform 102 may then convert these distances to the real world and determine the real-world angle that the floor line's projection makes with the primary line using basic triangle relations. To convert these distances to the real-world distances, the dynamic distance estimation output platform 102 may use the same method outlined above to compute real-world orthogonal distances to the primary line.

In a similar manner as described above, it may also be possible to use the LSD algorithm to calculate the roof line for the vehicle. In these instances, the dynamic distance estimation output platform 102 may run the LSD algorithm on the upper region of the bounding box (as it has been defined previously). In these instances, the dynamic distance estimation output platform 102 may select, from all the lines detected by LSD, the longest non-vertical line that is farthest away from the ground plane, which may be verified by taking the mean orthogonal distances from each of the two line end-points to either the line that divides the lower region from the upper region inside the bounding box, or to the floor line. The dynamic distance estimation output platform 102 may then average the two distances from both end-points of the line detected by LSD. In some instances, the dynamic distance estimation output platform 102 may compare these averages among all the lines detected by LSD and then selected the one providing the highest average. For the non-vertical nature of the line, the same criteria considered above for the floor line may also be applied by the dynamic distance estimation output platform 102 in this case. An additional attribute for selection by the dynamic distance estimation output platform 102 in this method may be the variation in brightness between the area below the selected line and the area above the line. In some instances, the roof line may present the greatest variation in brightness because the area below the line may correspond to the vehicle's frame, while the area above the line may correspond to whatever part of the scenery happens to be there (e.g., trees, the sky, or the like), which may be a different color (and thus brightness) than the particular vehicle's frame color.

Therefore, the two criteria mentioned above (farthest distance to ground plane and greatest brightness variation) may be satisfied by the dynamic distance estimation output platform 102 simultaneously (e.g., the dynamic distance estimation output platform 102 may rank all the lines according to these criteria by assigning a score value for each criteria and then selecting the line that achieves the greatest value after summing both scores). Once the roof-line is determined by the dynamic distance estimation output platform 102, the computing platform may proceed as in the case with the floor line and may project the roof line over the ground plane (e.g., using the posterior or the front wheel point of contact). Then similarly, as it was done above for the floor line's projection, the dynamic distance estimation output platform 102 may obtain the orthogonal distances between each end-point of the roof line's projection and the primary line and may convert these to real-world distances. Finally, after applying basic geometry relations, the computing platform may find the real-world angle between the roof line's projection and the primary line, which may provide the dynamic distance estimation output platform 102 with another way to calculate the instantaneous vehicle's heading with respect to the ego vehicle's heading. The major points of procedure above are illustrated in FIG. 10.

Figure 11:
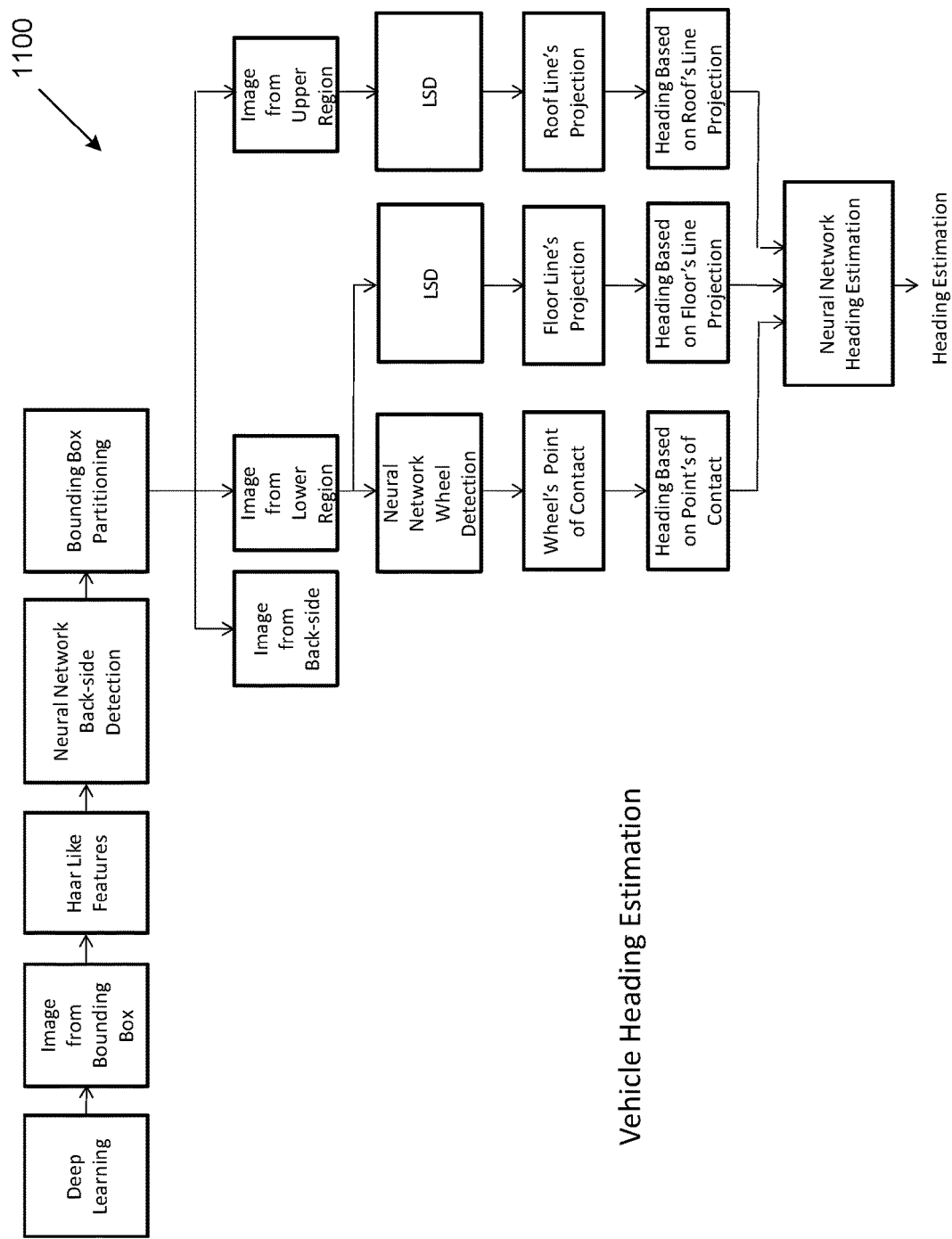

As it can be observed, a number of methods are described herein to determine the detected vehicle's heading. These methods are shown, for example, in illustration 1100, which is shown in FIG. 11. Described herein are a method that finds the contact point of the wheels on the vehicle's side, and methods that provides the heading based on the vehicle's floor line and the heading based on the vehicle's roof line. Since these methods may be affected by different noise sources, they may be combined provide one single heading estimation that exploits these three different sources of information. For this purpose, a Neural Network or a Support Vector Machine may be trained to determine the actual vehicle heading using, as inputs, the heading information from the three sources mentioned above, plus the longitudinal and the lateral distance of the vehicle. In these instances, the longitudinal and the lateral distances are included so that the neural network or svm learns to perform the corresponding adjustments when the vehicle is far away as opposed to near the ego-vehicle. It is expected that as the vehicle is located farther away, its image may provide reduced definition and thus some adjustments will be needed. This way, the learning machine may help to compensate for these situations while still exploiting all the available information that can be extracted by the dynamic distance estimation output platform through the hierarchical processing from the bounding box. A complete diagram illustrating all the different processing that occurs to determine a detected vehicle heading is provided in FIG. 11. In this case all the processing starts with the deep learning object detection.

To generate a training set with the above mentioned characteristics, the dynamic distance estimation output platform 102 may can collect image data using a forward facing dash board mounted camera (e.g., camera 104) in an ego-vehicle driving approximately on a straight trajectory and have another vehicle to be used as the detected vehicle visible through the field of view of the camera 104. In some instances, a camera mounted inside the detected vehicle pointing to the steering wheel may record all the steering wheel angles with time-stamps (e.g., the steering wheel may have special markers painted to indicate all the angles). On post processing, the steering angles can be correlated, by the dynamic distance estimation output platform 102, to footage from the detected vehicle captured by the dash board camera (e.g., camera 104). In some instances, another camera inside the ego-vehicle pointing to the ego-vehicle's steering wheel may be used to record the ego-vehicles steering angles (even though the ego-vehicle is expected to move over a straight trajectory) and provide further accuracy to the generation of ground truth data. In these instances, the data from the footage may be processed by the dynamic distance estimation output platform 102 to generate the tree types of heading angles through the bounding box hierarchical processing mentioned above and the ground truth labels will be obtained from the data collected from the steering angles captured by the footage from the inside cameras.

In some instances, the methods for lateral distance calculation described above may be further refined once the hierarchical processing of the bounding box is engaged by the dynamic distance estimation output platform 102. An alternate method that provides lateral distance, applied by the dynamic distance estimation output platform 102, uses the line over the ground plane that connects the point of contacts of the wheels that are on the visible side of the vehicle. In the method above, the dynamic distance estimation output platform 102 obtained the orthogonal distances from the points of contacts to the primary line. These orthogonal distances were used by the dynamic distance estimation output platform 102 to determine the heading angle with respect to the primary line, however, the dynamic distance estimation output platform 102 may also compute the real-world orthogonal distance to the primary line from the middle point of the line that connects the wheels points of contact. This last distance may be a more accurate approximation of the lateral distance of side of the vehicle to the primary line. In some instances, this may be the lateral distance from the side of the vehicle but not the distance from the vehicle's center of gravity. If this distance is needed, then the dynamic distance estimation output platform 102 may add the vehicle's half width to the lateral distance of the vehicle's side that was just computed. In some instances, the dynamic distance estimation output platform 102 may add the actual width determined through the hierarchical processing of the bounding box that uses Haar-like feature processing and a neural network to determine the vehicle's back-side and thus its corresponding real-world width.

In addition or as an alternative to the method that uses both wheel's points of contacts, the computing platform may resort to the floor line's projection. In these instances, the dynamic distance estimation output platform 102 may find the intersections (e.g., in the image plane) between this floor line projection and the deep learning's bounding box, and may take the middle point between the intersections. The dynamic distance estimation output platform 102 may obtain the real-world distance between the middle point and the primary line. In a similar way, the dynamic distance estimation output platform 102 may also use the roof line's projection to compute the intersections and middle point and obtain the real-word lateral distance between the primary line and the vehicle's side.

In a similar way as mentioned above, the dynamic distance estimation output platform 102 may use the three methods that have been presented herein to provide lateral distance and train a neural network to provide a single lateral distance that exploits these three methods. The dynamic distance estimation output platform 102 may add the original method (the first method described herein); however, this method is meant to provide the lateral distance considering the back-side of the vehicle. Accordingly, the dynamic distance estimation output platform 102 may adjust the original method and recalculate it for the middle of the vehicle, which may involve adding, to the longitudinal distance, half of the vehicle's length. In this case, the vehicle's length may be obtained by the dynamic distance estimation output platform 102 as follows. The dynamic distance estimation output platform 102 may use the vertical line that corresponds to the front-side of the bounding box and one of the vertical lines of the neural network detected back-side (the vertical line that is on the same side as the visible side of the vehicle, for example if the left side of the vehicle is visible then the dynamic distance estimation output platform 102 may consider the left vertical line of the rectangular window that corresponds to the neural network based detection of the vehicle's back side). Next, the dynamic distance estimation output platform 102 may intersect these vertical lines with the floor line's projection over the ground plane. In these instances, the two intersections may provide an approximation to the end points of a line that may be as long as the vehicle's length. In some instances, determining the real-world length of this line may provide the vehicle's length. Now the dynamic distance estimation output platform 102 may adjust the original lateral distance method to provide the lateral distance computed at the middle of the vehicle. For trajectories that are parallel to the ego-vehicle trajectory this adjustment might not make a difference. A diagram of the complete method to estimate lateral distance is provided in FIG. 12.

Figure 12:
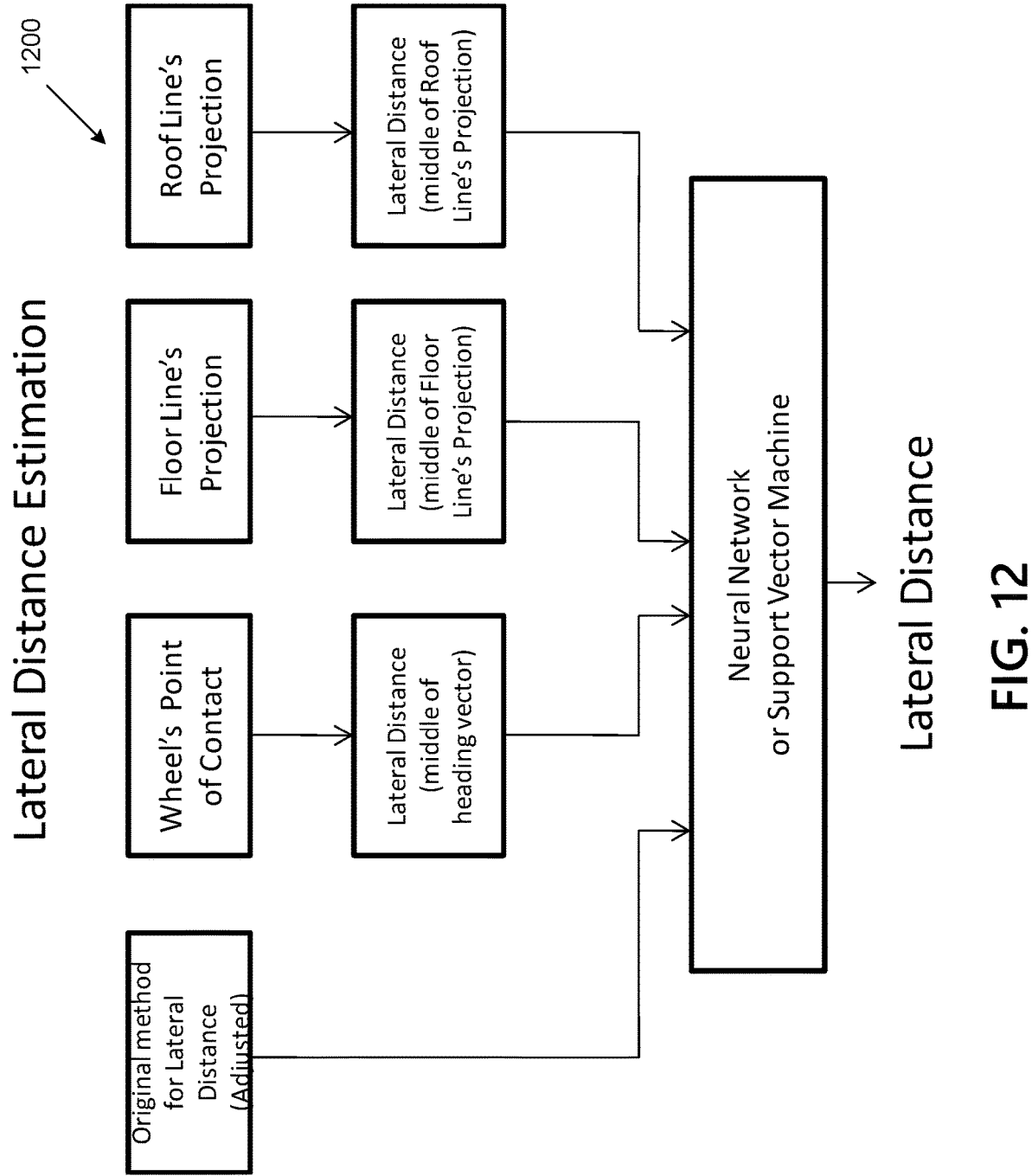

The training set for a neural network trained to provide lateral distances may be obtained by the dynamic distance estimation output platform 102 by having the ego-vehicle and another vehicle serving the purpose of a detected vehicle in an open area with the detected vehicle positioned with respect to the ego-vehicle at different longitudinal and lateral distances previously measured and marked on the ground plane. This may be a static way for the dynamic distance estimation output platform 102 to generate labeled data. Additionally or alternatively, a training set may be generated by the dynamic distance estimation output platform 102 on motion by using a special marked tracks. This is shown, for example, in illustration 1200, which is shown in FIG. 12.

For longitudinal distances, the methods previously described herein have relied on the bottom of the bounding box. Additionally or alternatively, the dynamic distance estimation output platform 102 may also use hierarchical processing to further refine this computation method. In some instances, the dynamic distance estimation output platform 102 may use the posterior wheel point of contact detected through the neural network and may use it as a basis to detect the other point of contact with the road for the other posterior wheel. In these instances, where the side for the vehicle is visible (e.g., to the camera 104), the dynamic distance estimation output platform 102 may could consider the horizontal line (referred to herein as line A in the image plane) that passes through the neural network detected point of contact and find the point of contact for the other posterior wheel in the vehicle. In these instances, the dynamic distance estimation output platform 102 may use the detected vehicle width (through the vehicle's back-side) to approximate the area on the image where the other point of contact should be. The dynamic distance estimation output platform 102 may also use the floor line's projection to consider a parallel to this line that passes through the deep learning bounding box corner (if the vehicle's left side is visible then this will be the bounding box's bottom right corner). This line may be referred to herein as line B. The intersection of these two lines may provide the dynamic distance estimation output platform 102 with the center of a search area for the point of contact for the other posterior wheel. In these instances, the dynamic distance estimation output platform 102 may search for the point that is further down (close to the bottom of the image) and that provides the highest change in brightness while being the closest to the intersection of lines A and B. In some instances, the highest change in brightness may occur because the color of the wheel may be distinctively darker than the color of the road. With the point of contact determined for the other posterior wheel, the dynamic distance estimation output platform may consider a horizontal line that is closest to both contact points and thus represents the line that will be the projection over the ground plane of the vehicle's posterior axle. It should be understood that no horizontal line may connect both points of contact (e.g., because the vehicle may have be turning, or due to image quantization effects), and that is why the horizontal line that is at the middle in between both contact points is considered. With this new horizontal line, the dynamic distance estimation output platform 102 may re-calculate the longitudinal distance for the vehicle. Accordingly, this will be refinement of the original method since the bottom side of the deep learning bounding box generally passes through the points of contacts for the wheels.

Figure 17:
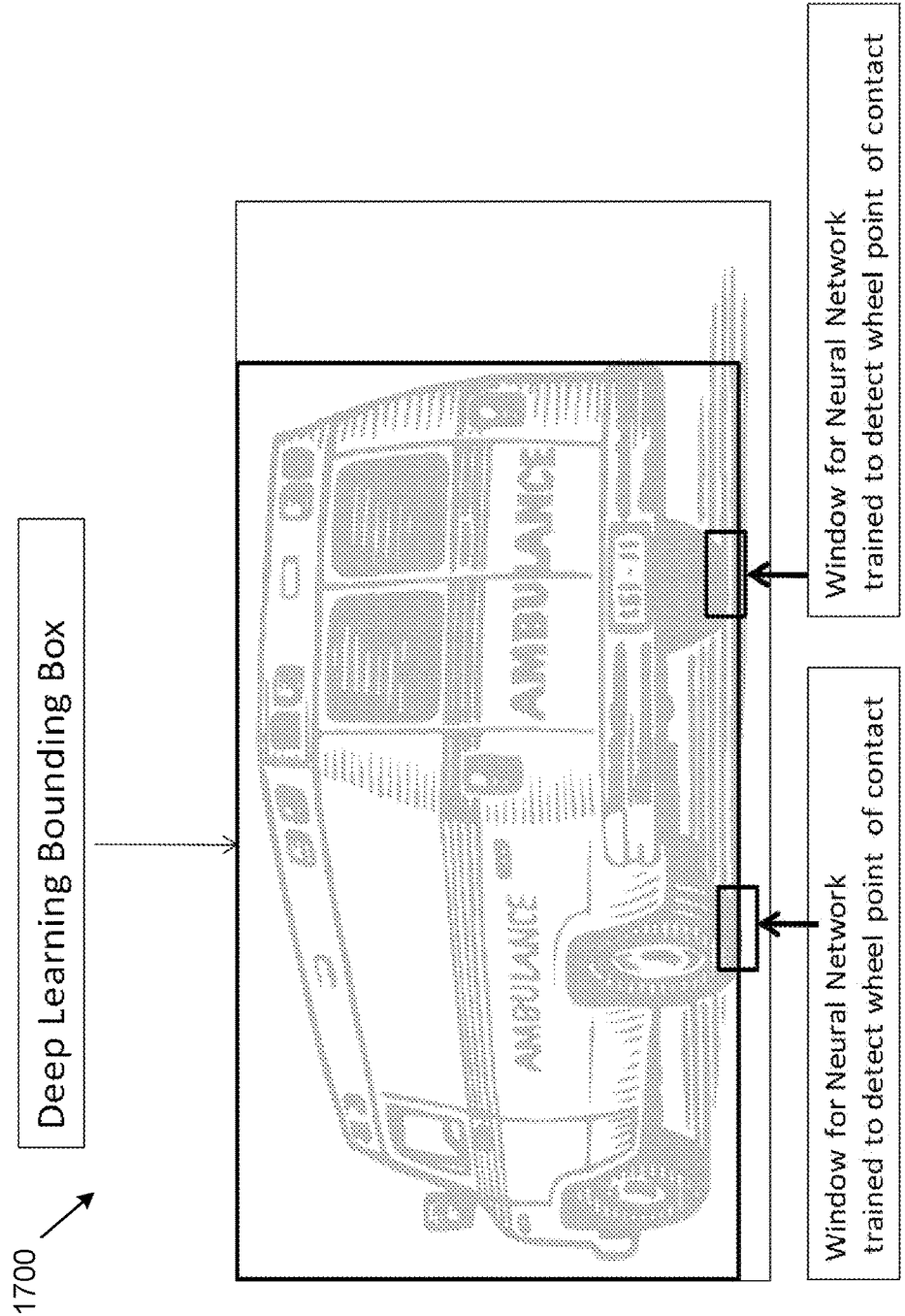

In these cases where the vehicle is in front of the ego-vehicle or too far away for the vehicle's side to be visible, the dynamic distance estimation output platform 102 may consider a method that directly finds the wheels points of contact. In these instances, the dynamic distance estimation output platform 102 may determine rectangular search areas that are located around the two bottom corners of the bounding box and search for the pixels that provide the greatest change in brightness and that at the same time are the closest to the corners of the bounding box. In these instances, the actual transition area for each posterior wheel may be trained in a neural network so that a more adaptable mechanism is available to detect the transitioning from wheel to road. The scanning region for a rectangular window detecting the transition may be established by the dynamic distance estimation output platform 102 around the two bottom corners of the deep learning bounding box. After the neural network provides the highest response, the middle of the detection window may be used by the dynamic distance estimation output platform 102 to determine the point of contact for the wheel. After determining the points of contacts for the wheels, the dynamic distance estimation output platform 102 may connect these points of contact through a horizontal line in the same way as described above and the dynamic distance estimation output platform 102 may compute the longitudinal distance to this horizontal line using the same equation as the one provided at the beginning of this description. Illustration 1700, which is shown in FIG. 17, provides an illustration of the windows referred above to be used for Neural Network.

The scanning window in this case may have different sizes and all of these sizes may be transformed to a common size window for the neural network (which is similar to the procedure described above for the neural network based detection of the wheels on the side of the vehicle). In these instances, the distance from the camera 104 may be the actual points of contacts of the wheels, and thus to obtain the distance to the back-side of the vehicle an adjustment is needed.

This adjustment may be provided through an estimation based on the vehicle category determined either from the classification provided by the deep learning detector or from the actual vehicle dimensions obtained using the methods that will be described below (e.g., to determine the real world 3D size). Once the vehicle category (truck, sedan, bus, or the like) and some estimation of its size is determined, the adjustment based on the real-world distance between the posterior wheels and the back-side of the vehicle may be provided.

With the methods described above, it may be possible to determine not only heading, longitudinal and lateral distances, but also the vehicle dimensions. As described above, the actual real-world vehicle width may be determined by the dynamic distance estimation output platform 102 through the bounding box hierarchical processing that finds the width using Haar-like features and the neural network. In some instances, the vehicle length may be determined by the dynamic distance estimation output platform 102 through the projection on the ground plane of the floor line's projection and the intersection of this line with the deep learning bounding box. The vehicle height may be determined by the dynamic distance estimation output platform 102 through the roof line and its projection over the ground plane. In these instances, the dynamic distance estimation output platform 102 may use the vertical lines from the roof line end-points to the line that connects the vanishing point with the posterior (or front) wheel point of contact. In these instances, the real-world distances of these vertical lines may provide the height of the vehicle (e.g., from the roof to the ground plane). In some instances, due to noise on the different detections involved these vertical lines will not have the same length. Accordingly, the vehicle height may be estimated by the dynamic distance estimation output platform 102 as the average of the two real-world distances of the vertical lines. This is shown, for example, in illustration 1200, which is shown in FIG. 12.

Figure 13:
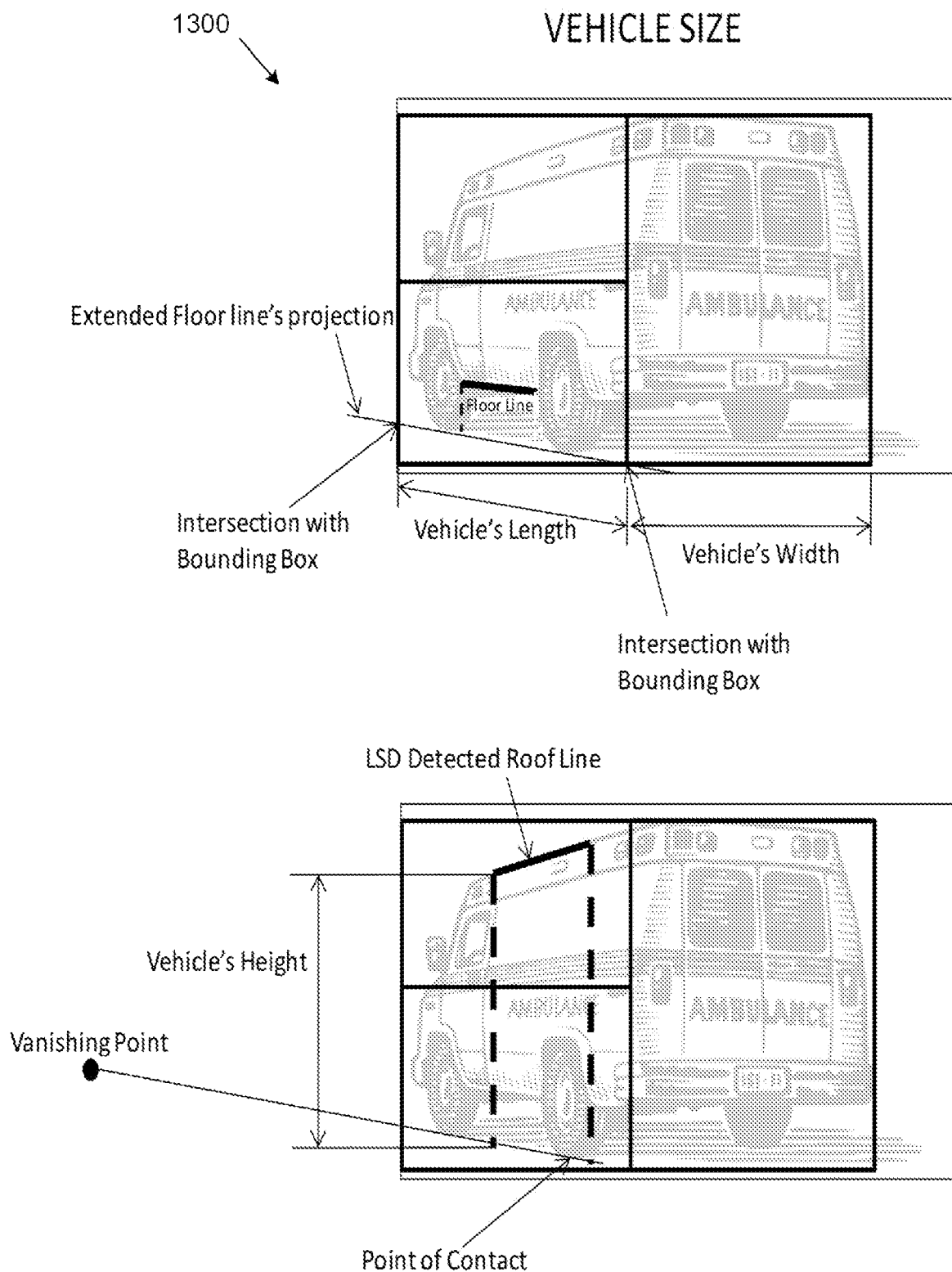

Even though the deep learning object detection may provide the ability to classify the vehicles as trucks, buses, and sedan cars, the ability to determine real-world vehicle dimensions may provide an additional corroboration on vehicle type, since the vehicle dimensions may provide an accurate way to determine vehicle category. Even within sedan types, there may be small (e.g., compact size) vehicles that might not be distinguished by the deep learning detector. Similarly, in some instances, there may be different bus sizes, which might not be distinguished by deep learning either. In these instances, the size of the detected vehicle may provide useful information in terms of determining risk for the ego-driver, especially under situations where erratic and unsafe maneuvers are detected for a given vehicle. For instance, an unsafe driver piloting a larger vehicle may become more dangerous and preventive actions should to be taken. FIG. 13 shows an illustration on how to obtain the three real world vehicle dimensions according to the methods described above.

The heading determination methods described previously provide instantaneous heading information, which might only use image content information for one image frame. It is possible, however, to provide heading information based on content from two or more frames. This heading information may be used by the dynamic distance estimation output platform 102 as corroboration of the heading information generated by the previous methods that work with a single image frame.

In some instances, the dynamic distance estimation output platform 102 may generate a short trajectory. For example, the short trajectory may be based on two frames and may provide two real-world positions over the ground plane (e.g., the road), and the real-world vector that connects these two positions may provide an angle that this vector makes with respect to the ego vehicle's primary line. Thus, the dynamic distance estimation output platform 102 may use this angle to determine the detected vehicle's heading with respect to the ego-vehicle's own heading.

In some instances, a minimum of two image frames may be used by the dynamic distance estimation output platform 102, however more than two image frames may provide more heading values (e.g., by using additional vectors based on the additional positions provided by the additional image frames). Since the physics of vehicle motion may make it difficult for a vehicle to change significantly its heading on the short time frame of three or more image frames (e.g., at 30 frames per second this would correspond to 0.1 seconds) the ability to obtain several heading values may allow the dynamic distance estimation output platform 102 to provide a more accurate heading estimation through averaging.

Figure 14:
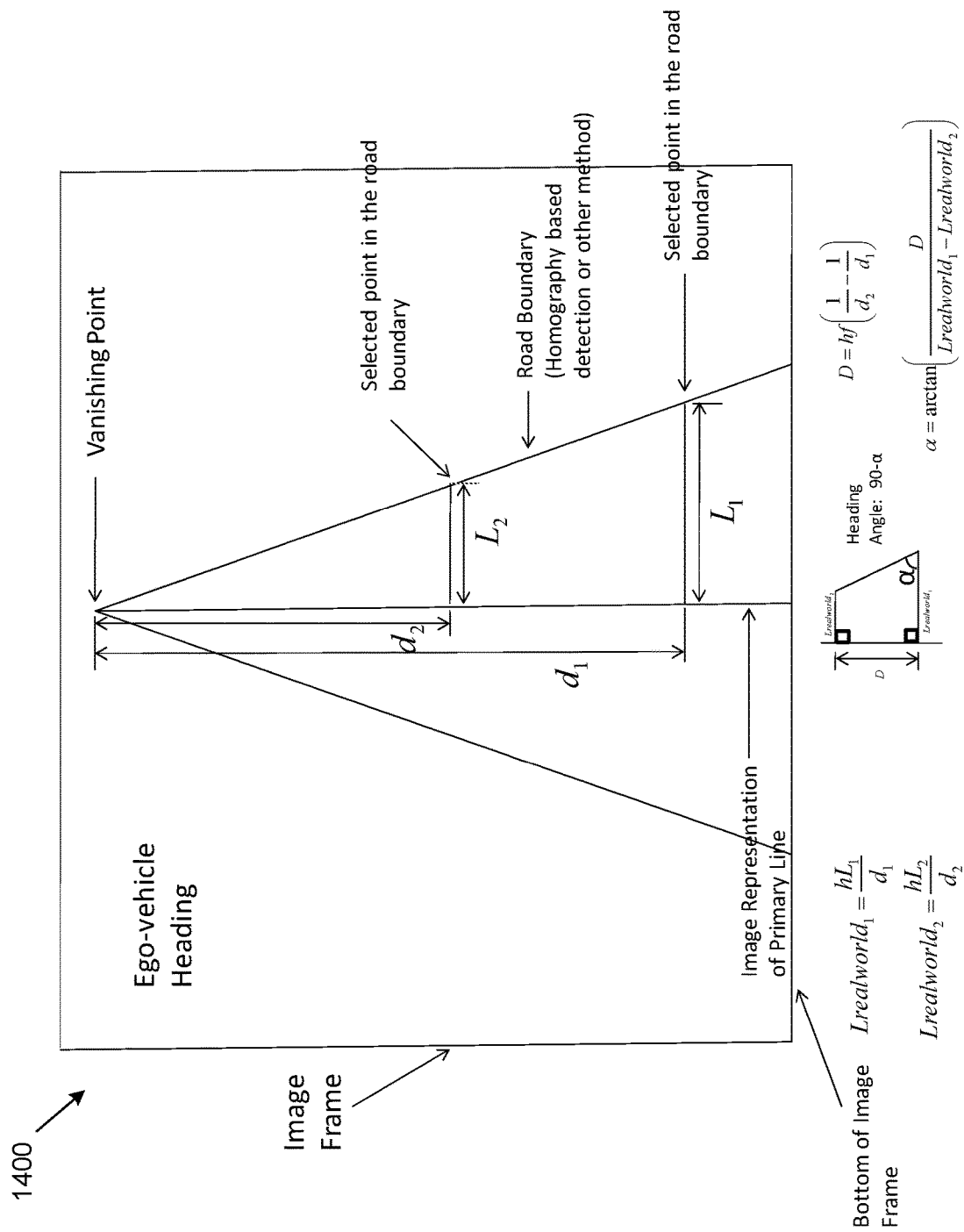

To determine a heading for the ego-vehicle to the dynamic distance estimation output platform 102 may resort to some reference on the driving scene so that such reference may be used by the dynamic distance estimation output platform 102 to establish ego-vehicle heading with respect to that reference. Since the dynamic distance estimation output platform 102 may assume a road in front of the ego-vehicle, the dynamic distance estimation output platform 102 may use several methods to detect the road boundary through lane boundary detection based on computer vision. In these instances, methods based on homography transformation (also known as inverse perspective mapping) coupled with blob detection may allow for reliable road boundary detection by the dynamic distance estimation output platform 102. The detected lane boundary may provide a reference that may be compared by the dynamic distance estimation output platform 102 against the primary line. In these instances, two points over the lane boundary may be selected (e.g., the pixels that are on the border of the lane that is closer to the primary line) by the dynamic distance estimation output platform 102 and real-world orthogonal distances to the primary line may be estimated by the dynamic distance estimation output platform 102 for both points. For this purpose, the dynamic distance estimation output platform 102 may find a horizontal line (e.g., in the image plane) drawn from each selected pixel in the road boundary lane to the image representation of the primary line and may find the corresponding real-world distance corresponding to this line using the relations presented previously above for lateral distance determination. Using simple geometry relations, the dynamic distance estimation output platform 102 may determine the angle that the lane boundary has with respect to the primary line. In these instances, this same angle may be the heading that the ego-vehicle has with respect to the road boundary. In these instances, this may be the absolute ego-vehicle heading and may be used by the dynamic distance estimation output platform 102 to determine the absolute heading for all the detected vehicles in the image. The heading methods previously described above provided the relative heading with respect to the ego-vehicle's primary line. In contrast, using the methods described herein, the relative heading for each detected vehicle may be added to the absolute heading for the ego-vehicle by the dynamic distance estimation output platform 102 and used to determine absolute heading with respect to the road boundary for each detected vehicle in the image. Illustration 1400, which is shown in FIG. 14, provides an illustration of the calculations to obtain the vehicle heading according to the method described above. In this figure the only variable that is not identified is h which is the height of the camera that is mounted on the ego-vehicle and that provides all the imagery that is used for the methods describes herein. In these instances, the actual vehicle heading angle is 90-$\alpha$ because the lane boundary line is the reference.

The deep learning bounding box may be used by the dynamic distance estimation output platform 102 to provide useful information for driving risk assessments (or any other driving related task) for objects other than vehicles. Accordingly, since the dynamic distance estimation output platform 102 may use deep learning to detect bicyclists, then the dynamic distance estimation output platform 102 may can exploit the methodologies described herein to provide the information on the trajectory. In one or more instances, the bounding box that contains the bicyclist image may be used by the dynamic distance estimation output platform 102 to determine his or her position. In these instances, the dynamic distance estimation output platform 102 may use the bottom of the bounding box in the same way as described above for the vehicles to determine position with respect to the ego-vehicle's camera (e.g., camera 104). In these instances, longitudinal and lateral distances to the bicyclists may be provided by the dynamic distance estimation output platform. The position information over two image frames may be used by the dynamic distance estimation output platform 102 to determine the bicyclist heading with respect to the ego-vehicle primary line by determining the vector connecting the bicyclist position over two consecutive image frames (as described above with regard to the detected vehicles). Several measurements of bicyclist heading are possible over time by using more additional image frames, which may improve the heading estimation through averaging of the heading values across consecutive image frames. In a similar manner as described above for the detected vehicles, the bicyclist relative speed and relative acceleration with regards to the ego-vehicle may be determined by the dynamic distance estimation output platform 102 by using bicyclist positions over consecutive frames. Absolute speeds and accelerations for the detected bicyclist may be determined by the dynamic distance estimation output platform 102 by adding the relative speeds and acceleration vectors to the ego-vehicle absolute speed and acceleration vectors.

In addition to the speeds and accelerations, the dynamic distance estimation output platform 102 may apply the previous methodologies described herein to determine the real-world size of the bicyclist. In these instances, given the deep learning bounding box, the dynamic distance estimation output platform 102 may take the distance (e.g., in the image plane) between the top side and the bottom side, and may determine the real-world conversion of this distance, using the same methods presented before. In these instances, the dynamic distance estimation output platform 102 may resort to the longitudinal distance to the bicyclist to perform the real-world conversion. In some instances, this real-world distance may provide the height of the bicyclist and may be used to distinguish between an adult bicyclist and a child bicyclist. This is important information to assess risk and this might not be provided by the deep learning object detector.

Figure 15:
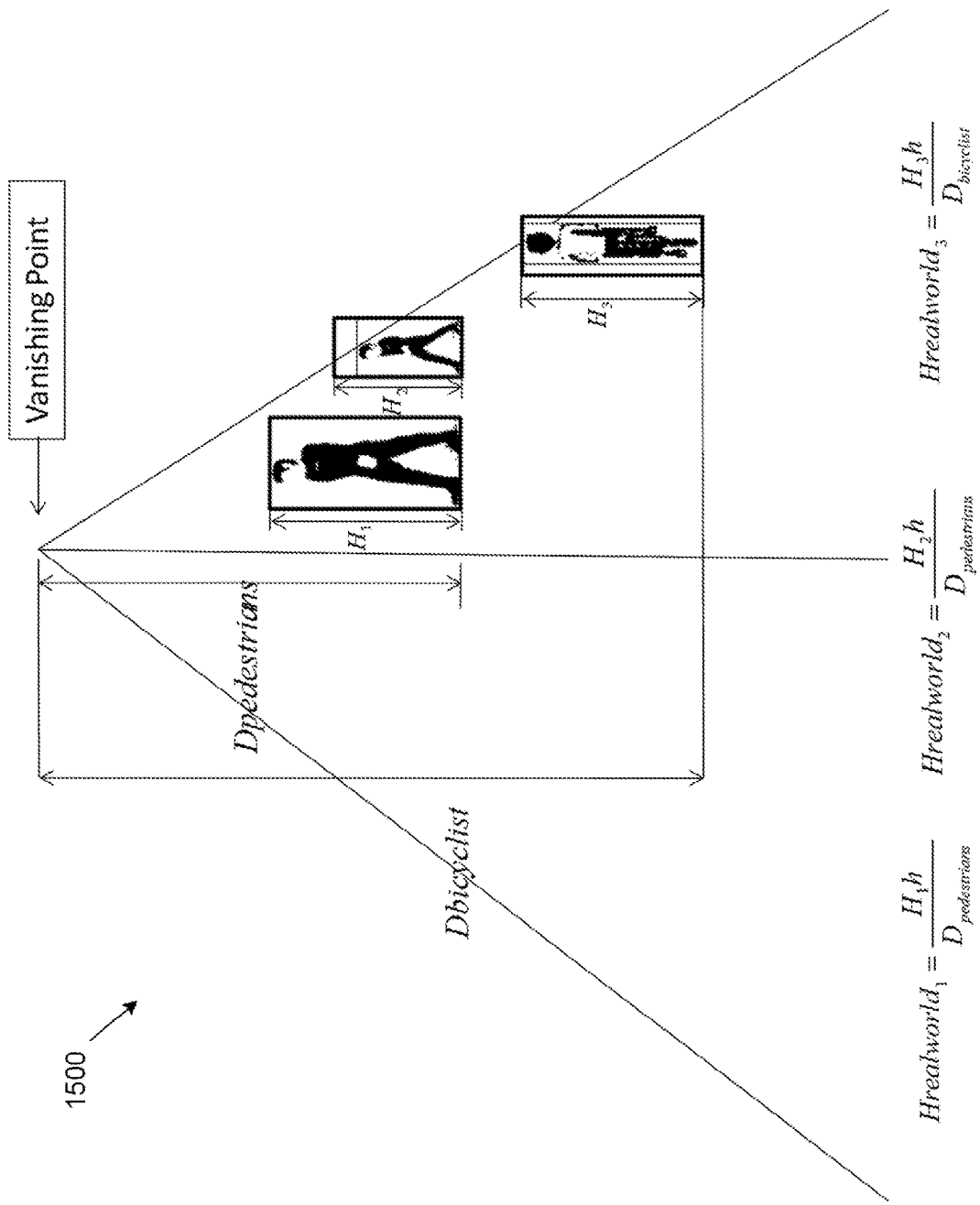

The same methods provided above for bicyclists may be applied to pedestrians. The real-world longitudinal distance, lateral distance, relative speed, relative acceleration, absolute speed, absolute acceleration, relative and absolute heading, and pedestrian trajectory may be provided by the dynamic distance estimation output platform 102. Additionally, the same methods may be applied to determine pedestrian size and thus distinguish an adult pedestrian from a child pedestrian, which is information that might not be provided by the deep learning detector. Illustration 1500 of FIG. 15 provides an illustration of the method to determine size for pedestrians and bicyclists. In this figure, the only variable that is not identified is h which is the height of the camera above the ground plane.

For these objects that are not recognized by the deep learning object detector, the methods described herein might not allow any determination of distance, positioning, speed, and other metrics. Therefore the deep learning object detector may be important for the determination of risk, or other driving application. There are situations, however, where for different reasons a moving object might not detected due to limitations on the deep learning detector accuracy (ability to identify) or just because the moving object is unknown and does not fit any of the categories for which the object detector was trained. In these cases, however, it remains important to detect moving objects regardless of the deep learning detector ability to identify them.

A method that would allow detecting any object on the scenario in front of the ego-vehicle may exploit the perspective transformation methods described herein and the ability to work with pixel content on regions of the image. Accordingly, a region of the image frame around the far end of the road may be selected for analysis by the dynamic distance estimation output platform 102. This region may be processed by the dynamic distance estimation output platform 102 first to perform image segmentation (several algorithms, such as region growing algorithms, for image segmentation may be used in these instances) on it so that any object within this region may be detected using available methods in the literature to perform such segmentation. In these instances, any detection achieved by the deep learning object detector may be removed from consideration by the dynamic distance estimation output platform 102 excluding the corresponding bounding box from the image segmentation processing. This may be performed by the dynamic distance estimation output platform 102 since the area covered by the bounding box may already be identified. The result of performing image segmentation for the region mentioned above may be a group of blobs, which may correspond to different elements in the image that might not have been detected/identified by the deep learning detector. The next step is for the dynamic distance estimation output platform 102 to compute the centroid for each blob detected. The centroid may be obtained by the dynamic distance estimation output platform 102 by obtaining the center of gravity of the outer most pixels located at the blob boundary. The outer most pixels may be sampled by the dynamic distance estimation output platform 102 from the boundary at some given interval around the boundary of the blob. The sampling process may be achieved by the dynamic distance estimation output platform 102 by superposing a grid over the blob and selecting the pixel that is closest to the center of one of the squares in the grid. Once the center of gravity is determined by the dynamic distance estimation output platform 102 for all the blobs, the centers of gravity may be stored.

The next step in this process is to anticipate what the locations for the blobs will be after some period of time, which may be used to determine if some of these blobs moved over this time. For instance, after 0.5 seconds the ego-vehicle may move forward and, according to the current ego-vehicle speed, it may be possible for the dynamic distance estimation output platform 102 to determine the positions that the centers of gravity for the detected blobs will have considering that such blobs will be static in the real world but that due to the ego-vehicle motion may have moved in the image plane according to the laws of perspective transformations. For example, a blob in the image corresponding to a static object on the road shoulder may have moved in the image plane following a trajectory in the image plane that will be a straight line that connects the vanishing point and the location of the center of gravity that was detected for this blob previously (e.g., 0.5 seconds ago). This static blob should appear on the subsequent image frames with its center of gravity located on the same straight line. This straight line in the real world may correspond to a line that is parallel to the ego-vehicle's primary line. The previous method may be applied by the dynamic distance estimation output platform 102 to all the blobs in the image.

Figure 16:
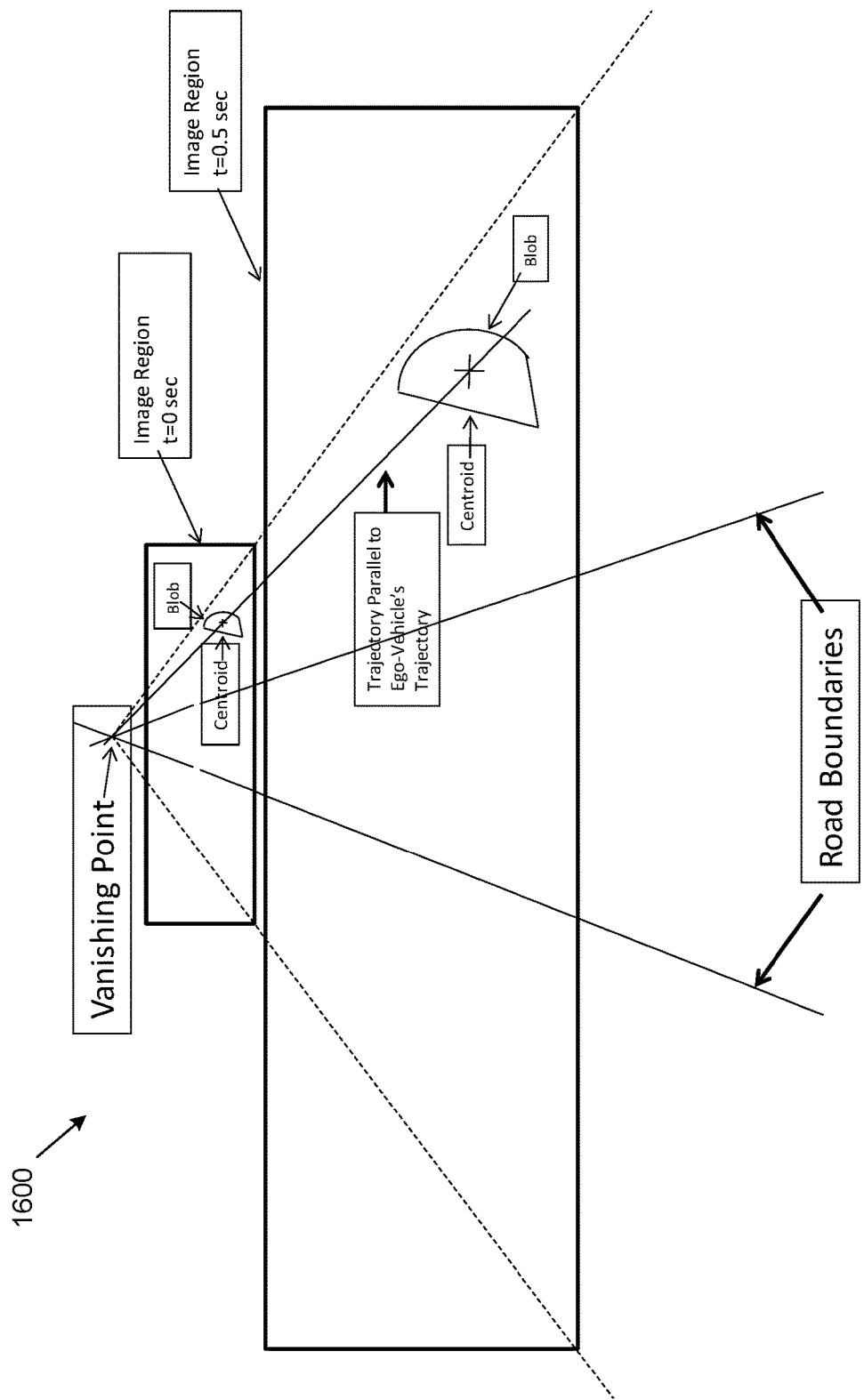

The next step is for the dynamic distance estimation output platform 102 to take another region on the image plane that corresponds in size to the region considered 0.5 seconds in the past. The objective is to consider this other region so that the real-world content that was evaluated 0.5 seconds ago may be re-evaluated in the present, according to the proper image dimensions that would correspond to the new sizes in the image plane that such objects will achieve due to the perspective transformations. For example, since the ego-vehicle moves forward, the blobs corresponding static object 0.5 seconds ago may appear bigger on the image plane. On the new image region being considered for the present, a new image segmentation process may be performed over this image by the dynamic distance estimation output platform 102 and all the blobs may be detected. As it was done for the original image region, the centroids for the newly detected blobs may be computed by the dynamic distance estimation output platform 102 using a grid to sample pixels on the blobs boundary. The centroids for the new blobs may be compared, by the dynamic distance estimation output platform 102, against the centroids that were anticipated in the previous step for the blobs that were considered originally. In these instances, due to proximity of centroids, the dynamic distance estimation output platform 102 may identify which blobs are being correlated between the current image region and the image region from 0.5 seconds ago. If a significant difference between centroids for the same blob is detected (controlled by a threshold that determines a minimum displacement), the dynamic distance estimation output platform 102 may determine that such blob has moved in the time frame of 0.5 seconds and thus such blob might not be static. An illustration of the scenario with a static blob is presented in illustration 16, which is shown in FIG. 16. In FIG. 16, only two image regions at t=0 seconds and t=0.5 seconds are presented.

If the blob is not static, then the dynamic distance estimation output platform 102 may launch a tracking process that stores all the centers of gravity for the non-static blob and may use these centroids to determine a trajectory and to extrapolate such trajectory. In these instances, the dynamic distance estimation output platform 102 may use the previously described methodologies to determine the position of the blob in the real-world, and to calculate its speed and acceleration. It is important for the dynamic distance estimation output platform 102 to determine if this blob and its current and extrapolated trajectory are in collision course with the ego-vehicle, which would provide a general protection method for the ego-vehicle to react on any type of object that could appear moving towards the ego-vehicle. This detection by the dynamic distance estimation output platform 102 may include static objects that might not move but that may be on the current trajectory of the ego-vehicle, which may trigger a collision warning for the ego-vehicle. Detection over subsequent frames by the dynamic distance estimation output platform 102 may continue to be performed to keep track of the vehicle. For instance, another image region may be evaluated by the dynamic distance estimation output platform 102 1 second after the first image frame, and another image region may be evaluated 1.5 seconds after. The interval of 0.5 seconds may be reduced when the absolute of the ego-vehicle increases so that the detection of moving objects may be performed by the dynamic distance estimation output platform 102 fast enough so that warnings of possible future collisions may be provided with enough anticipation.

Additionally, the detection of any object in this way may provide an additional layer of protection for the ego-vehicle for these cases where the deep learning detector may fail to detect a vehicle, a bicyclist, a pedestrian, or the like. The segmentation processing mentioned above may be performed using computer vision algorithms running on the CPU. Although certain methods of image segmentation favor CPU processing in terms of accuracy instead of deep-learning/GPU processing, future deep learning developments may improve the state of the art for segmentation and in this case the methods of the current invention may be realized through deep-learning running general image segmentation. In this latter case, a GPU may be dedicated to image segmentation in addition to the GPU dedicated to the deep-learning object detection that has been referenced several times herein.

In one or more instances, one or more of the systems described herein may include a dynamic distance estimation output platform (e.g., dynamic distance estimation output platform 102) and a communication interface (e.g., a mobile phone, built-in vehicle displays unit or separate display unit) configured to receive real-time driver alerts while a vehicle is being driven. In these instances, the one or more of the systems described herein may comprise a memory storing computer-executable instructions that, when executed by the at least one processor, cause the one or more of the systems described herein to activate driver risk alerts and warnings such as forward collision warning, lane departure warning, pedestrian and cyclist proximity warnings, neighbor car proximity warning, driver risk and driver scoring. Additionally or alternatively, the computer-executable instructions, when executed by the at least one processor, may cause the one or more of the systems described herein to activate driver risk/scoring that can also be used to update the insurance database and policy parameters of the insurance policy with driver-specific risk and display updated insurance policy information resulting from the dynamic distance output platform. For example, the communication interface may cause display of a graphical user interface similar to graphical user interfaces 1800 and/or 1900, which are shown in FIGS. 18 and 19, respectively.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and memory storing computer-readable instructions that, when executed by the at least one processor, cause the computing platform to:
receive, from a camera disposed in a first vehicle, image data capturing a second vehicle;
determine, using one or more deep learning algorithms and the image data, a longitudinal distance between the first vehicle and the second vehicle by determining an orthogonal distance between:
a center-of-projection corresponding to the camera, and
an intersection of a backside plane of the second vehicle and ground below the second vehicle;
generate a distance estimation output using the longitudinal distance; and
transmit, to a computing device, the distance estimation output to cause the computing device to generate a graphical user interface indicating the distance estimation output, the graphical user interface indicating a speed of the first vehicle.

2. The computing platform of claim 1, wherein the graphical user interface indicates a distance between the first vehicle and the second vehicle.

3. The computing platform of claim 1, wherein the graphical user interface indicates a maneuver of the first vehicle based on the distance estimation output.

4. The computing platform of claim 3, wherein the maneuver includes one or more of slowing down, speeding up, braking, turning, and swerving.

5. The computing platform of claim 1, wherein the camera is a visible light camera.

6. The computing platform of claim 1, wherein the distance estimation output is generated in real-time.

7. A method comprising:
receiving, from a camera disposed in a first vehicle, video data capturing a second vehicle;
determining, using one or more deep learning algorithms and the video data, a longitudinal distance between the first vehicle and the second vehicle by determining an orthogonal distance between:
a center-of-projection corresponding to the camera, and
an intersection of a backside plane of the second vehicle and a surface below the second vehicle;
generating a distance estimation output based on the longitudinal distance; and
transmitting, to a computing device, the distance estimation output to cause the computing device to generate a graphical user interface indicating the distance estimation output.

8. The method of claim 7, wherein the graphical user interface indicates a distance between the first vehicle and the second vehicle.

9. The method of claim 7, wherein the graphical user interface indicates a speed of the first vehicle.

10. The method of claim 7, wherein the graphical user interface indicates a maneuver of the first vehicle based on the distance estimation output.

11. The method of claim 10, wherein the maneuver include one or more of slowing down, speeding up, braking breaking, turning, and swerving.

12. The method of claim 7, wherein the camera is a visible light camera.

13. The method of claim 7, wherein the distance estimation output is generated in real-time.

14. One or more non-transitory computer-readable media storing instructions that, when executed by a computing platform comprising at least a processor, memory, and a communication interface, cause the computing platform to:
receive, from a camera disposed in a first vehicle, video data capturing a second vehicle;
determine, using one or more deep learning algorithms and the video data, a longitudinal distance between the first vehicle and the second vehicle by determining an orthogonal distance between:
a center-of-projection corresponding to the camera, and
an intersection of a backside plane of the second vehicle and a surface below the second vehicle;
generate a distance estimation output using the longitudinal distance; and
transmit the distance estimation output to cause a computing device to generate a graphical user interface presenting the distance estimation output.

15. The one or more non-transitory computer-readable media storing instructions of claim 14, wherein the graphical user interface indicates a distance between the first vehicle and the second vehicle.

16. The one or more non-transitory computer-readable media storing instructions of claim 14, wherein the graphical user interface indicates a speed of the first vehicle.

17. The one or more non-transitory computer-readable media storing instructions of claim 14, wherein the graphical user interface indicates a maneuver of the first vehicle based on the distance estimation output.

18. The one or more non-transitory computer-readable media storing instructions of claim 17, wherein the maneuver includes one or more of slowing down, speeding up, braking, turning, and swerving.

19. The one or more non-transitory computer-readable media storing instructions of claim 14, wherein the distance estimation output is generated in real-time.

* * * * *